(12) United States Patent
Fujimoto et al.

(10) Patent No.: US 6,259,082 B1
(45) Date of Patent: Jul. 10, 2001

(54) IMAGE READING APPARATUS

(75) Inventors: Hisayoshi Fujimoto; Hiroaki Onishi; Toshihiko Takakura; Norihiro Imamura, all of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/124,712

(22) Filed: Jul. 30, 1998

(30) Foreign Application Priority Data

| Jul. 31, 1997 | (JP) | 9-206340 |
| Jul. 31, 1997 | (JP) | 9-206341 |
| Jul. 31, 1997 | (JP) | 9-206342 |
| Jul. 31, 1997 | (JP) | 9-206343 |
| Aug. 6, 1997 | (JP) | 9-211712 |

(51) Int. Cl.$^7$ .................................................. H04N 1/04
(52) U.S. Cl. .................. 250/208.1; 250/216; 250/227.2; 362/26; 385/484
(58) Field of Search .......................... 250/208.1, 216, 250/227.2, 227.26, 227.31, 227.32; 362/26, 27, 30, 31; 358/509, 510, 511, 475, 484, 296; 385/146

(56) References Cited

U.S. PATENT DOCUMENTS

| 4,714,983 | * | 12/1987 | Lang | 362/27 |
| 5,070,431 | * | 12/1991 | Kitazawa et al. | 362/31 |
| 5,295,047 | * | 3/1994 | Windross | 362/26 |
| 5,499,112 | * | 3/1996 | Kawai et al. | 358/475 |
| 5,959,740 | * | 9/1999 | Takeda et al. | 358/296 |

FOREIGN PATENT DOCUMENTS 6-217084   8/1994   (JP).

* cited by examiner

Primary Examiner—John R. Lee
(74) Attorney, Agent, or Firm—Merchant & Gould P.C.

(57) ABSTRACT

An image reading apparatus is provided which includes light source for irradiating a document sheet with light, an elongated light-leading member through which light emitted from the light source propagates. The light-leading member is provided with a head surface, a bottom surface, a first side surface and a second side surface. The image reading apparatus further includes a row of image sensor chips for detecting light reflected on the document sheet, and an insulating circuit board for carrying the image sensor chips. The light source is also mounted on the circuit board. The cross section of the light-leading member is pentagonal, parabolic, or elliptic.

17 Claims, 42 Drawing Sheets

FIG.21A
FIG.21B
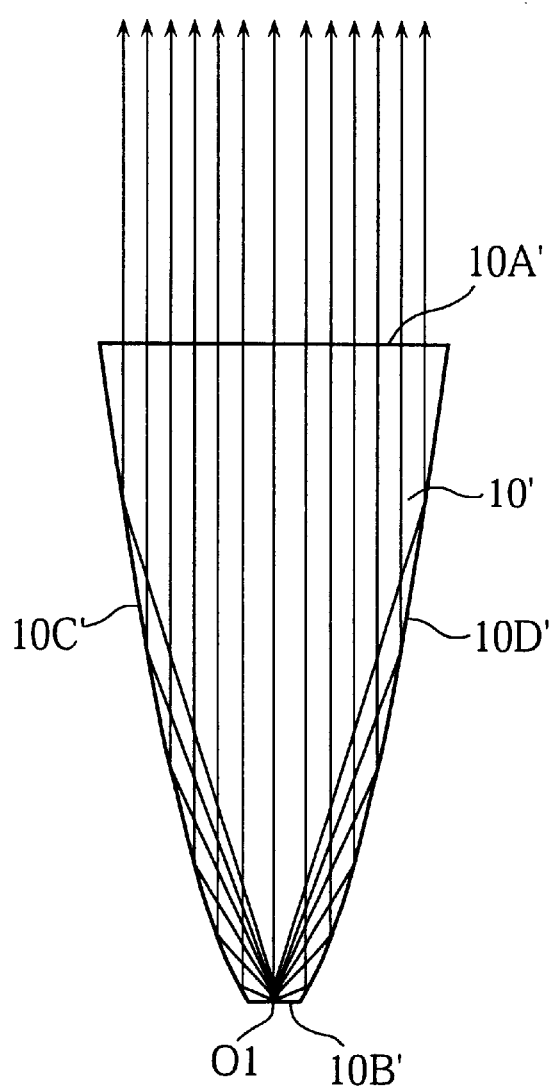
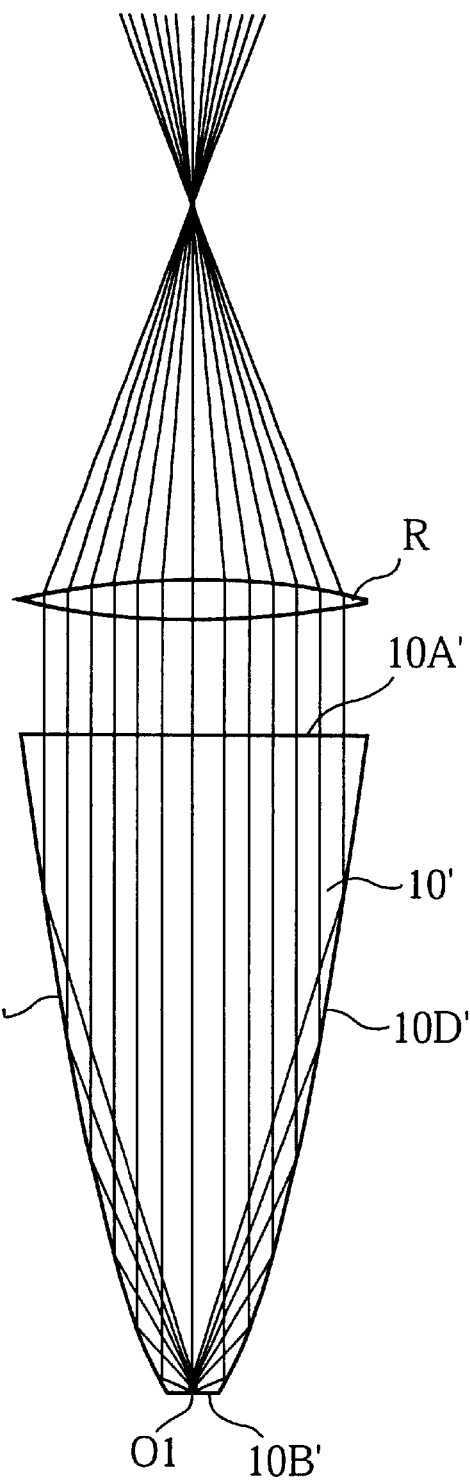

RM

IMAGE READING APPARATUS

BACKGROUND OF THE INVENTION

1. Field of the Invention

The present invention relates to an image reading apparatus. The present invention also relates to a light-leading member advantageously used in an image reading apparatus.

2. Description of the Related Art

An example of conventional image reading apparatus is disclosed in JP-A-6-217084. Referring to FIGS. 38 and 39 of the accompanying drawings, the conventional image reading apparatus (Ae) includes a lighting unit B accommodated in a housing 4e for illuminating a document paper sheet K, a glass plate 91 supported by the housing 4e, and a lens array 51e for focusing image-carrying reflection light coming from a reading section 90 of the image reading apparatus Ae. The image reading apparatus Ae also includes a plurality of image sensor chips 52e (only one is shown) mounted on a printed circuit board 6e.

As best shown in FIG. 39, the conventional lighting unit B includes a transparent, elongated light-leading member 1e and a light source 2e such as an LED (light emitting diode) carried by an additional printed circuit board 92. The light-leading member 1e includes an upper surface 12e, a lower surfaces 14e opposite to the upper surface 12e, two end surface 15e–16e, and so forth. The upper surface 12e is directed toward the reading section 90.

The light source 2e is arranged in facing relation to the end surface 15e. Thus, the light rays emitted from the light source 2e enter the light-leading member 1e at the end surface 15e to propagate through the light-leading member 1e toward the other end surface 16e. The light rays within the light-leading member 1e may be internally reflected several times by the upper surface 12e, the lower surface 14e and so forth, before the light rays come out through the upper surface 12e for illuminating the document paper sheet K.

The conventional image reading apparatus Ae has been found disadvantageous in the following points.

As stated above, two separate printed circuit boards (6e and 92) are used for the conventional image reading apparatus Ae. This means that it is necessary to form wiring patterns separately for the two circuit boards 6e and 92, which is time-consuming. In addition, the housing 4e should be arranged to accommodate the two circuit boards 6e and 92 at different positions. Such an arrangement may make the manufacturing of the housing 4e complicated.

Further, as shown in FIG. 38, side surfaces of the light-leading member 1e are exposed (i.e., the side surfaces are not covered by inner portions of the housing 4e or any other additional element.) Due to this arrangement, part of light propagating through the light-leading member 1e will unduly come out from the side surfaces, but not be used for illuminating the document paper sheet K.

Still further, even if the light propagating through the light-leading member 1e comes out through the upper surface 12e, the light may be directed in other directions but not toward the reading section 90.

SUMMARY OF THE INVENTION

It is therefore an object of the present invention to provide an image reading apparatus wherein light emitted from a light source is effectively directed toward a reading section for a document paper sheet to be read out, thereby overcoming the disadvantages described above.

Another object of the present invention is to provide an image reading apparatus which is easily manufactured.

A further object of the present invention is to provide a light conductor which is advantageously used in an image reading apparatus.

According to a first aspect of the present invention, there is provided a light conductor comprising an elongated light-leading member for propagation of light, the light-leading member being provided with a head surface, a bottom surface, a first side surface and a second side surface, the first and second side surfaces extending between the head surface and the bottom surface, wherein at least one of the first and the second side surfaces regulates directions of light rays propagating through the light-leading member toward the head surface.

Preferably, the light conductor further comprises reflecting means for covering said at least one of the firs and the second side surfaces.

The reflecting means may comprise an elongated reflection member made of a white, reflective resin material, or reflective sheet.

Preferably, the light-leading member and the reflecting means may be positionally secured to each other by engaging means.

According to a preferred embodiment, the light-leading member has an asymmetric cross section. In such an instance, the first side surface may comprise an inclined portion overhanging the bottom surface. The asymmetric cross section may be pentagonal.

According to another preferred embodiment, said at least one of the first and second side surfaces extends, in cross-section, along a parabola.

According to still another preferred embodiment, said at least one of the first and second side surfaces extends, in cross-section, along an ellipse.

According to a second aspect of the present invention, there is provided a light equipment used in an image reader comprising:

a light source;

an elongated light-leading member for propagation of light emitted from the light source, the light-leading member being provided with a head surface, a bottom surface, a first side surface and a second side surface, the first and second side surfaces extending between the head surface and the bottom surface; and reflecting means for covering at least one of the first and the second side surfaces.

Preferably, the light source is arranged in facing relation to the bottom surface.

Preferably, the light-leading member includes a light-guiding section which is provided with a reflection surface, so that light emitted from the light source in a direction perpendicular to a longitudinal direction of the light-leading member is reflected by the reflection surface in the longitudinal direction of the light-leading member.

According to a third aspect of the present invention, there is provided an image reading apparatus comprising:

a light source for irradiating a document sheet with light;

an elongated light-leading member for propagation of light emitted from the light source, the light-leading member being provided with a head surface, a bottom surface, a first side surface and a second side surface, the first and second side surfaces extending between the head surface and the bottom surface;

a row of image sensor chips for detecting light reflected on the document sheet; and an insulating circuit board for carrying the image sensor chips;

wherein the light source is mounted on the circuit board together with the image sensor chips.

The head surface may be smaller in cross-section dimension than the bottom surface.

At least one of the first and second side surfaces may extend, in cross-section, along a parabola. In such an instance, the bottom surface is arranged adjacent to a focus of the parabola.

Alternatively, at least one of the first and second side surfaces may extend, in cross-section, along an ellipse. In such an instance, the bottom surface is arranged adjacent to a focus of the ellipse.

Other features and advantages of the present invention should become clear from the detailed description to be made hereinafter referring to the accompanied drawings.

BRIEF DESCRIPTION OF THE DRAWINGS

In the accompanying drawings:

FIGS. 21A–21B illustrate an example of cross-sectional configuration for the light-leading member of the second embodiment;

DETAILED DESCRIPTION OF THE PREFERRED EMBODIMENT

Figure 1:
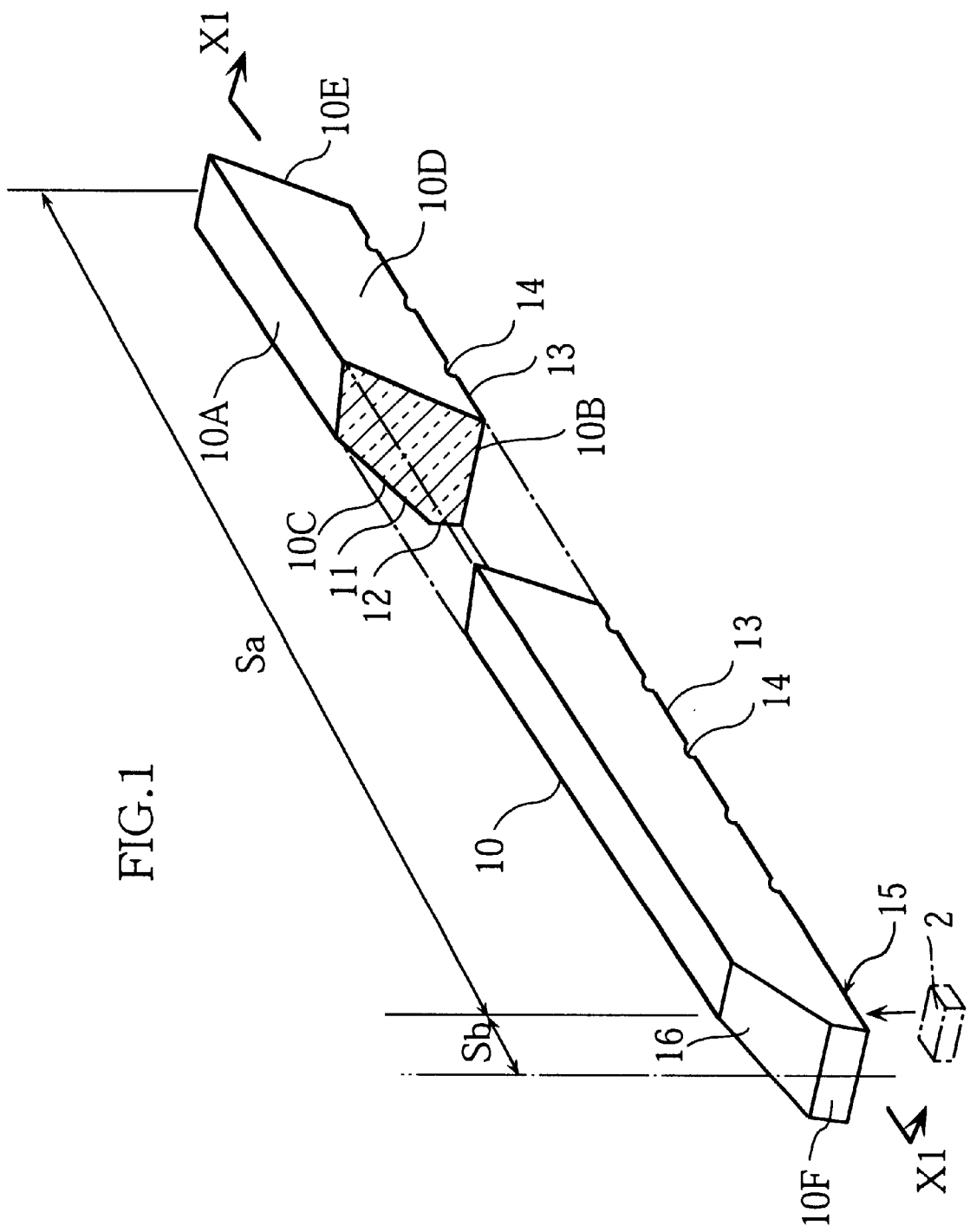
FIG. 1 is a perspective view, showing a light-leading member used for an image reading apparatus according to the first embodiment of the present invention.

The preferred embodiments of the present invention will be specifically described below with reference to the accompanying drawings. Throughout the drawings, similar or like parts will be designated by the same reference numerals or characters.

Figure 5:
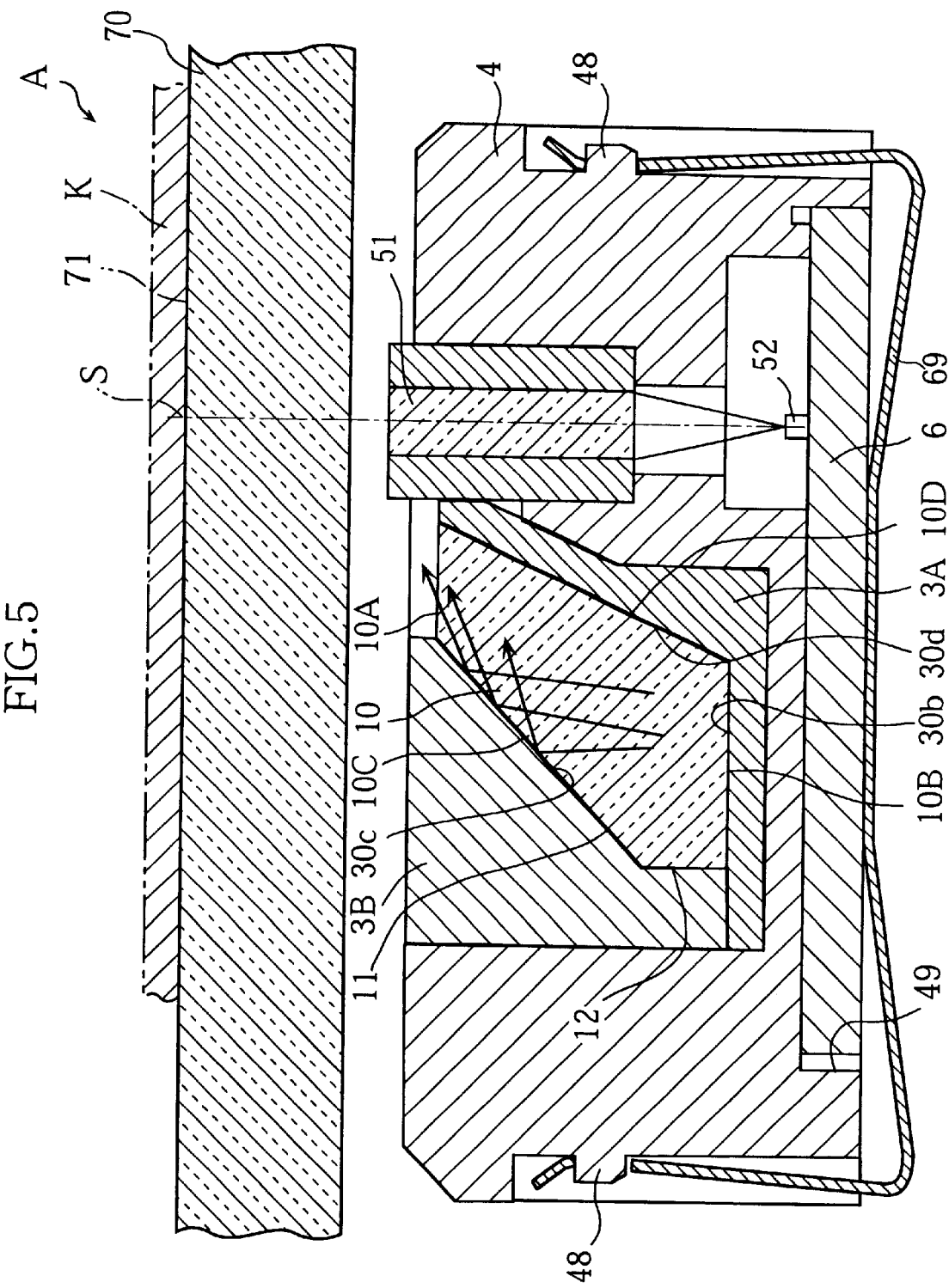
FIG. 5 is a sectional view of the same apparatus taken along lines X3—X3 in FIG. 4.
Figure 6:
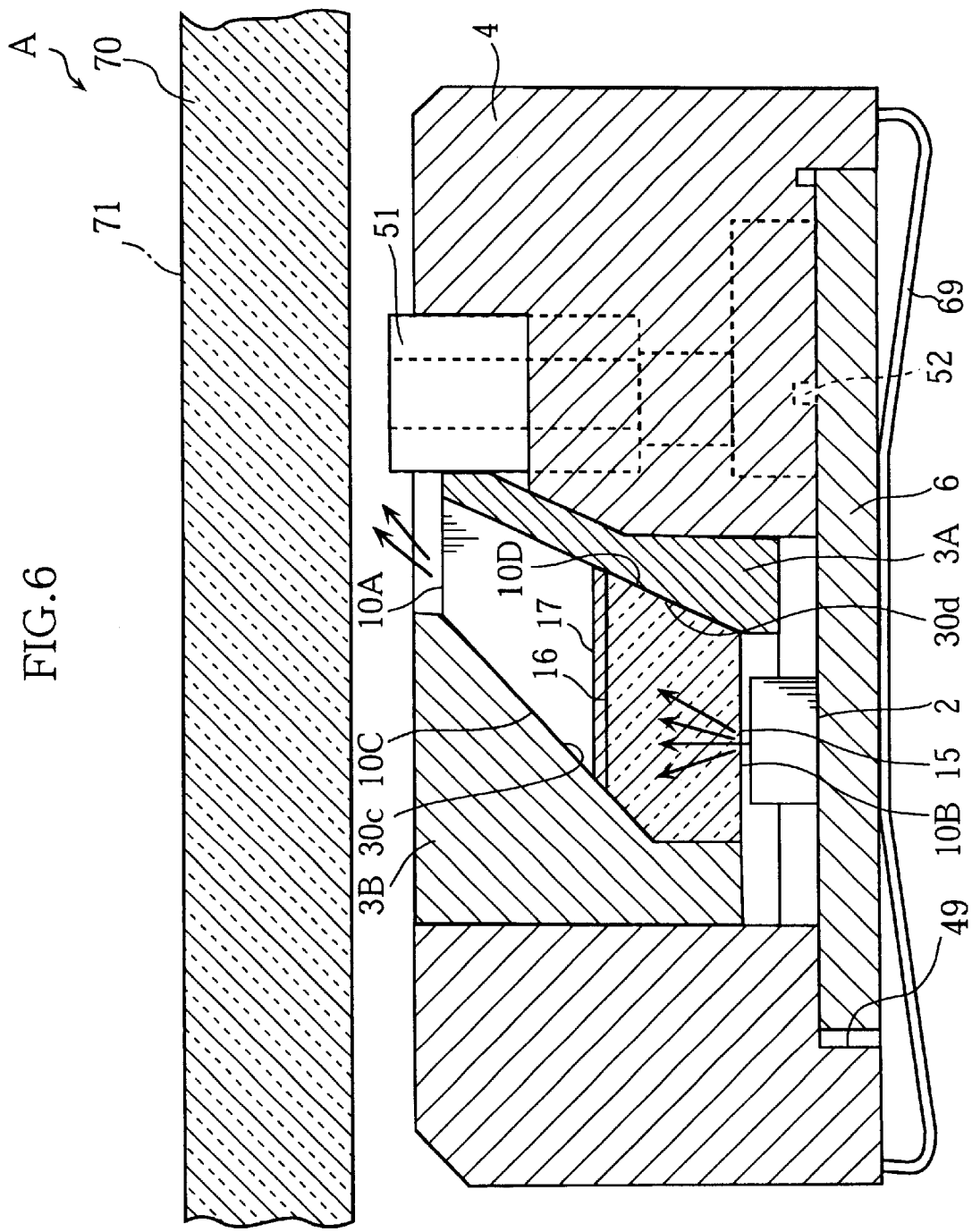
FIG. 6 is a sectional view of the same apparatus taken along lines X4—X4 in FIG. 4.
Figure 7:
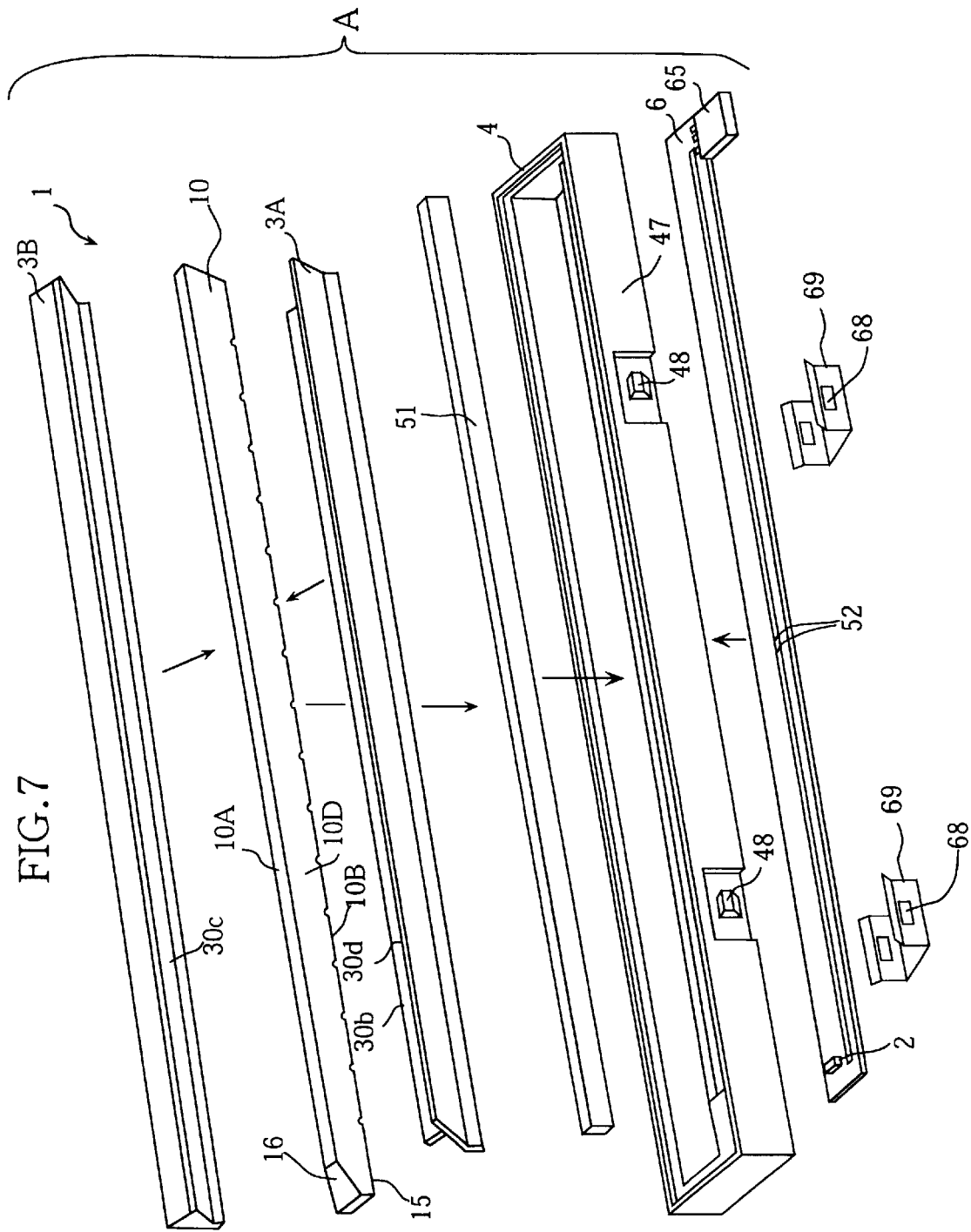
FIG. 7 is an explosive view illustrating the image reading apparatus of the first embodiment.

Reference is first made to FIGS. 1–7. Of these figures, FIG. 7 is an exploded view showing elements used for an image reading apparatus A according to a first embodiment of the present invention. As illustrated, the image reading apparatus A includes a light conductor 1 consisting of a light-leading member 10, a first reflection member 3A and a second reflection member 3B. The light conductor 1 will be described in detail hereinafter.

The image reading apparatus A also includes a housing 4 and a printed circuit board 6. The housing 4, which may be made of synthetic resin, is formed with an upward opening for accommodating the light conductor 1 and a lens array 51. The printed circuit board 6, which may be made of a ceramic material or a resin material such as epoxy, carries a light source 2, image sensor chips 52, and a connection terminal 65. The connection terminal 65 is provided for establishing electrical connection to an external device.

In the illustrated embodiment, the light source 2 is arranged at an end of the elongated printed circuit board 6, whereas the connection terminal 65 is arranged at the other end of the circuit board 6. Such an arrangement is advantageous in that the connection terminal 65 does not positionally interfere with the light source 2.

The light source 2 may include an LED (light-emitting diode) enclosed by a suitable resin package. For reading out monochromic images (i.e., images printed in black only), use is made of one kind of LED capable of emitting white light or a single color light. For reading out color images, three kinds of LEDs (red, green and blue) may be used. However, it is also possible to use a single LED capable of emitting white light for reading out color images. When plural LEDs are used, they may be enclosed together in a common package to be mounted on the printed circuit board 6. Alternatively, it is possible to mount the LEDs directly (i.e., without enclosing them by a resin package) on the printed circuit board 6. In this way, production costs can be reduced.

For accommodating the printed circuit board 6, the housing 4 is formed with a downward opening 49 (see FIG. 5 or 6). Further, the housing 4 is provided with protrusions 48 on each side surface 47. Those protrusions 48 come into engagement with bores 68 of fixing members 69 (FIG. 5). By using the fixing members 69, the printed circuit board 6 is easily attached to the housing 4. Each fixing member 69 may be made of a metal plate.

Reference is now made to FIG. 1 which is a perspective view showing the light-leading member 10. As illustrated, the light-leading member 10 is an elongated bar which may be made of a transparent resin material by using a molding die for example. A resin material suitable for making the light-leading member 10 may be PMMA (poly (methylmethacrylate)).

As viewed longitudinally, the light-leading member 10 is divided into two sections: a first section Sa and a second section Sb. The first section Sa has a uniform cross section, while the cross section of the second section Sb differs at positions.

The light-leading member 10 includes a head surface 10A, a bottom surface 10B extending in parallel to the head surface 10A (see also FIG. 3), a first side surface 10C and a second side surface 10D.

The above-mentioned surfaces 10A, 10C and 10D are rendered smooth (like a mirror), so that light will be totally reflected when the light meets those surfaces at an angle greater than the critical angle. When the light meets those surfaces at an angle smaller than the critical angle, the light will pass through them. Here, as is well known, the critical angle depends, roughly speaking, on the material of the light-leading member 10.

The light-leading member 10 also includes a first end surface 10E and a second end surface 10F opposite to the first end surface 10E. Both end surfaces extend upward from th bottom surface 10B at the right angle. Adjacent to the second end surface 10F is an inclined portion 16 of the head surface 10A.

Figure 2:
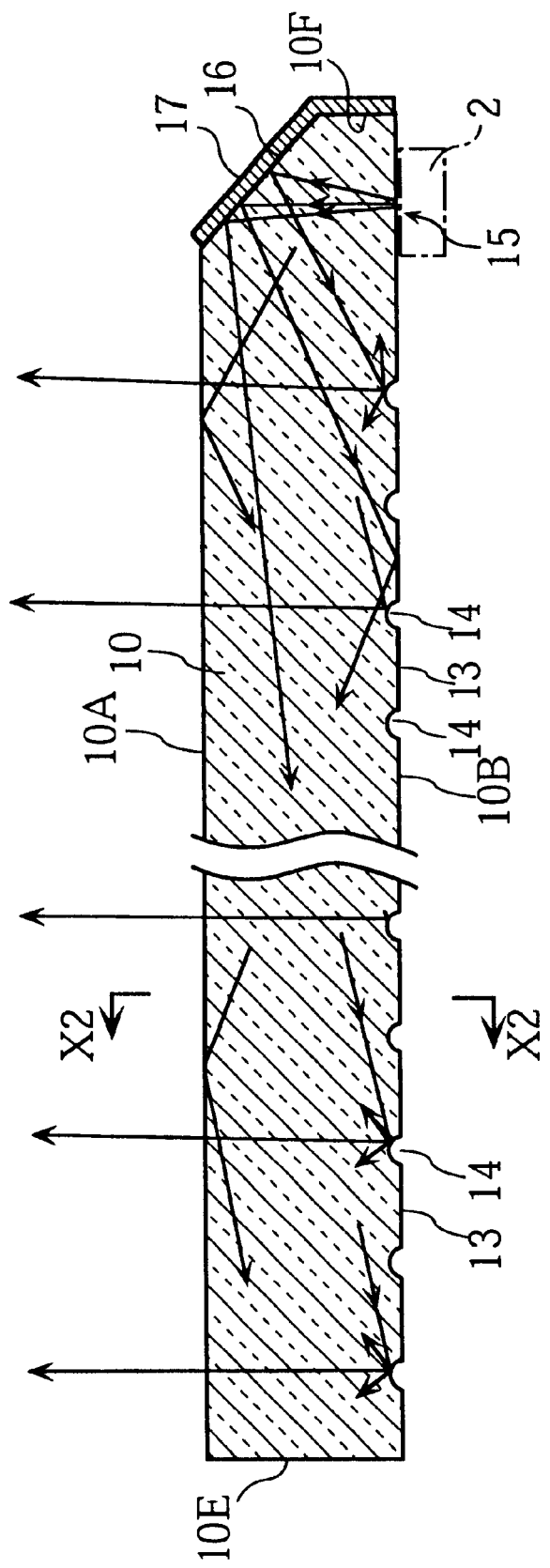
FIG. 2 is a sectional view showing the same light-leading member taken along lines X1—X1 in FIG. 1.
Figure 3:
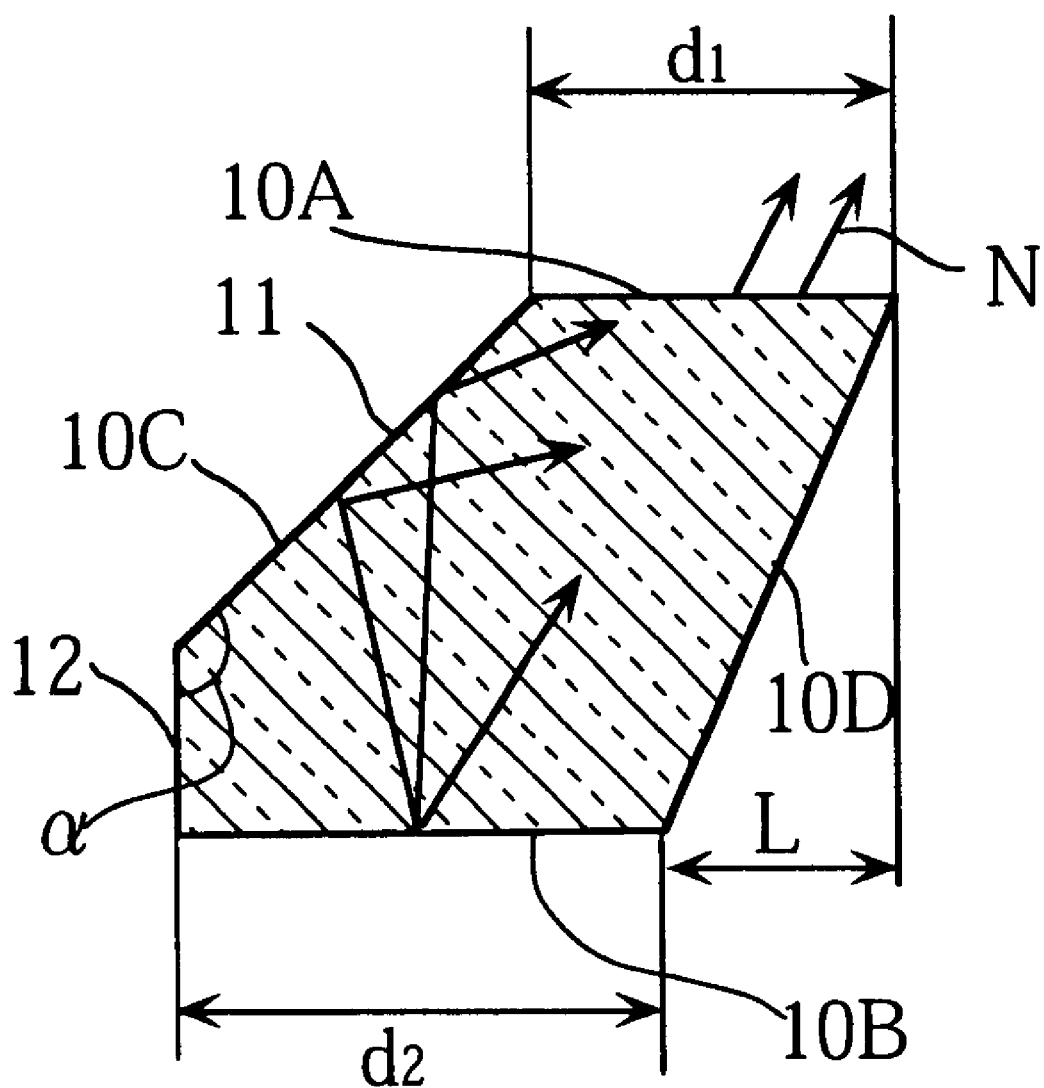
FIG. 3 is a sectional view of the same light-leading member taken along lines X2—X2 in FIG. 2.

Referring to FIG. 3 which is a sectional view taken along lines X2—X2 in FIG. 2, the second side surface 10D extends upward from the bottom surface 10B at an angle, so that the upper edge of the second side surface 10D is offset to the right (as viewed in FIG. 3) from its lower edge by a predetermined amount L.

The first side surface 10C has an inclined portion 11 adjacent to the head surface 10A, and a vertical portion 12 which is connected to the inclined portion 11 while also extending from the bottom surface 10B at the right angle. The angle a defined between the inclined portion 11 and the vertical portion 12 is greater than 90 degrees but smaller than 180 degrees. In other words, the inclined portion 11 overhangs the bottom surface 10B. The inclined portion 11 and the second side surface 10D approach each other as one sees them upwardly. As illustrated, The width d1 of the head surface 10A is shorter than the width d2 of the bottom surface 10B.

As shown in FIG. 2, which is a sectional view taken along lines X1—X1 in FIG. 1, the bottom surface 10B has a light-introducing portion 15 adjacent to the second end surface 10F. The light-introducing portion 15 has preferably a smooth surface. As will be described later with reference to FIG. 4, the light source 2 is to be arranged right below the light-introducing portion 15. Thus, the light emitted from the light source 2 will enter the light-leading member 10 through the light-introducing portion 15.

As shown in FIG. 2, the inclined portion 16 of the head surface 10A is located above the light-introducing portion 15. Preferably, the inclined portion 16 and the second end surface 10F are covered with a reflective plate 17. With such an arrangement, the light coming from the light source 2 will not unduly go out from the inclined portion 16 or the second end surface 10F.

Instead of utilizing the reflection plate 17, it is possible to apply a suitable reflective material over the inclined portion 16 and second end surface 10F by plating, depositing or sputtering for example. Reflective, white paint may also be applicable. In the illustrated embodiment, the inclined portion 16 is rendered flat. Instead, the inclined portion 16 may be curved.

After reflected by the inclined portion 16 backed by the reflective plate 17, the light will propagate through the light-leading member 10 longitudinally toward the first end surface 10E. As is easily understood, part of the light may directly reach the first end surface 10E, while the rest of it may be internally reflected several times by the head surface 10A, the bottom surface 10B and so on.

As shown in FIG. 2, the bottom surface 10B is formed wit a plurality of grooves 14 each having a semi-circular cross section. The grooves 14 are spaced from each other at predetermined intervals in the longitudinal direction of the light-leading member 10. Between adjacent grooves 14 are flat regions 13. Like the above-mentioned surfaces (i.e., the head surface 10A, the first side surface 10C and the second side surface 10D), the flat regions 13 are rendered smooth enough.

As can be seen from FIG. 2, due to the presence of the grooves 14, the light propagating through the light-leading member 10 longitudinally thereof will be reflected upward, and eventually go out from the light-leading member 10 through the head surface 10A.

More precisely, as shown in FIG. 3, the upward light tends to first arrive at the inclined portion 11 of the first side surface 10C, while part of the light may directly go out through the head surface 10A. As can be seen, light rays meeting the inclined portion 11 will go out through the head surface 10A after they are reflected by the inclined portion 11.

In the illustrated embodiment, only a single light source 2 is used, and the light source 2 is arranged below an end portion of the elongated light-leading member 10. However, it should be appreciated that the light emitted from the light source 2 will be equally distributed throughout the light-leading member 10, after it has been repeatedly reflected by the surfaces 10A, 10C and 10D and scattered by the grooves 14 of the bottom surface 10B. Thus, according to the illustrated embodiment, light for illuminating a document paper sheet is provided through the entire head surface 10A, with substantially equal luminous energy at any portion of the head surface 10A.

Figure 4:
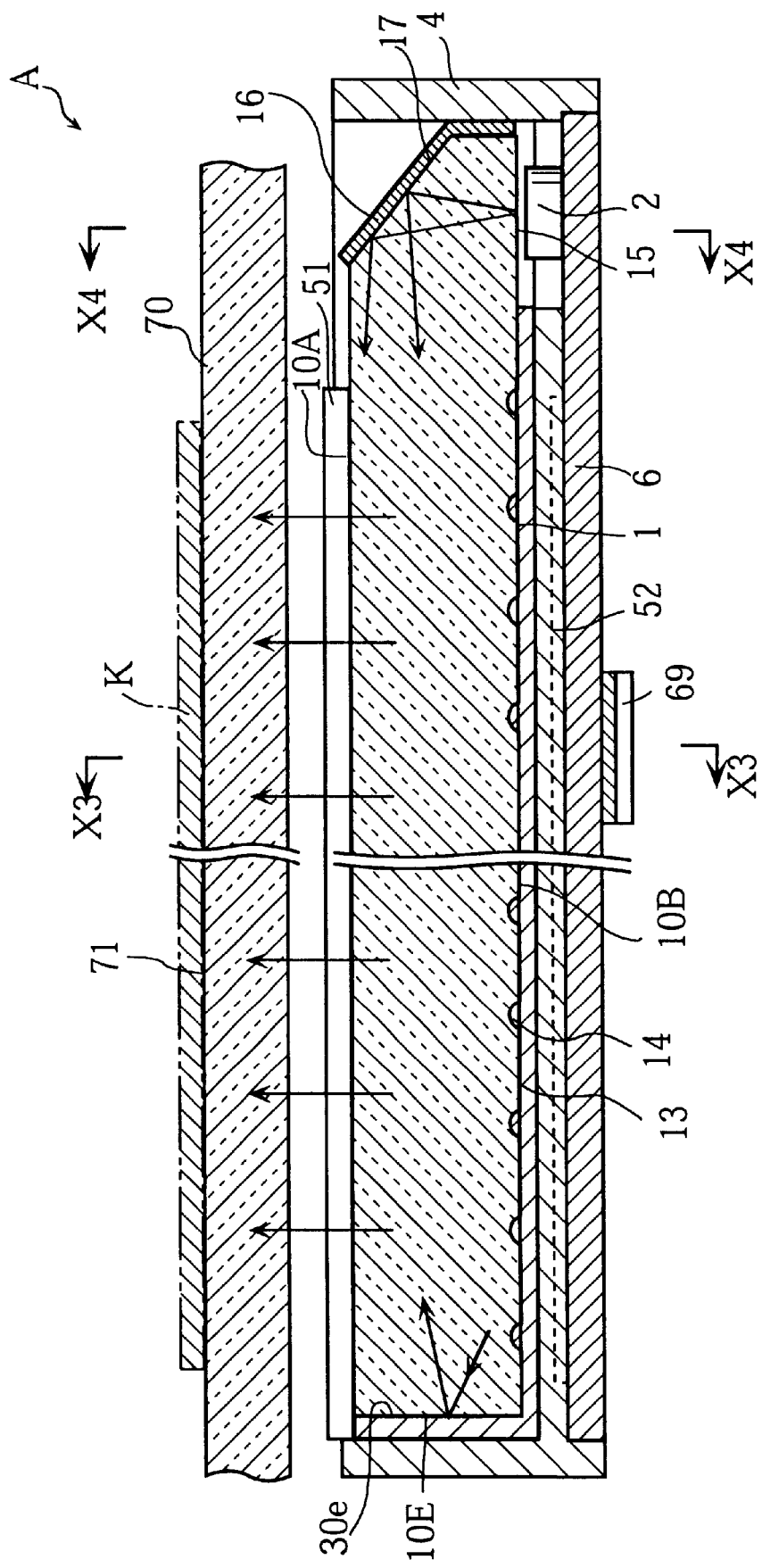
FIG. 4 is a longitudinal sectional view showing the image reading apparatus of the first embodiment.

Reference is now made to FIGS. 4–6 which show sectional views of the image reading apparatus A. Of these figures, FIG. 5 is a sectional view taken along lines X3—X3 in FIG. 4, while FIG. 6 is a sectional view taken along lines X4—X4 in FIG. 4. As shown in FIG. 4 for example, the image reading apparatus A includes a transparent glass plate 70 on which the document paper sheet K is placed.

For scanning the document sheet K, the housing 4 is reciprocated in the secondary scanning direction of the image apparatus A, while the glass plate 70 is stationary (flat-bed-type image reader). In the illustrated embodiment, a conventionally well-known mechanism is used for actuating the housing 4 in the above-mentioned manner. Thus, no description is made to the mechanism in this specification.

As best shown in FIG. 5, the lens array 51 is arranged below an image-reading section S. The lens array 51 is used for focusing image-carrying light (which comes from the document paper sheet K) onto the image sensor chips 52. The lens array 51 includes a plurality of rod lenses adjacently arranged in the primary scanning direction of the image reading apparatus A. Alternatively, a plurality of convex lenses may be used for the lens array 51.

The first and the second reflection members 3A–3B, which are substantially equal in length to the light-leading member 10 (see FIG. 7), are formed into configurations suitable for holding the light-leading member 10 in a sandwiching manner (see FIG. 5 for example).

With such an arrangement, the light-leading member 10 together with the first and the second reflection members 3A–3B is readily accommodated into the housing 4.

When assembled, the light-introducing portion 15 of the light-leading member 10 is held in facing relation to the light source 2, as shown in FIG. 4.

As shown in FIG. 5, the light-leading member 10 is placed in the housing 4 so that its second side surface 10D is closer to the lens array 51 than the first side surface 10C is. The first reflection member 3A includes a bottom surface 30b coming into contact with the bottom surface 10B of the light-leading member 10, and a side surface 30d coming into contact with the second side surface 10D of the light-leading member 10. The second reflection member 3B includes an inclined surface 30c coming into contact with the first side surface 10C of the light-leading member 10. Those surfaces 30b–30d of the reflection members 3A–3B prevent the light within the light-leading member 10 from unduly going out through the bottom surface 10B, the first side surface 10C or the second side surface 10D.

Referring back to FIG. 4, the first reflection member 3A is formed with a reflective end surface 30e which comes into contact with the first end surface 10E of the light-leading member 10. With such an arrangement, it is possible to prevent the light within the light-leading member 10 from unduly going out from the first end surface 10E of the light-leading member 10.

The first and second reflection members 3A–3B may be made of a white resin material. Thus, light is reflected to a great extent by the bottom surface 30b, the inclined surface 30c, the side surface 30d and the end surface 30e. In the illustrated embodiment, light is scattered by the surfaces 30b–30e.

According to the first embodiment, as previously stated, light emitted from the light source 2 is advantageously guided through the light-leading member 10 and led out from the head surface 10A in the substantially same direction. Thus, the document paper sheet K can be illuminated widthwise with a sufficient amount of light.

Figure 8:
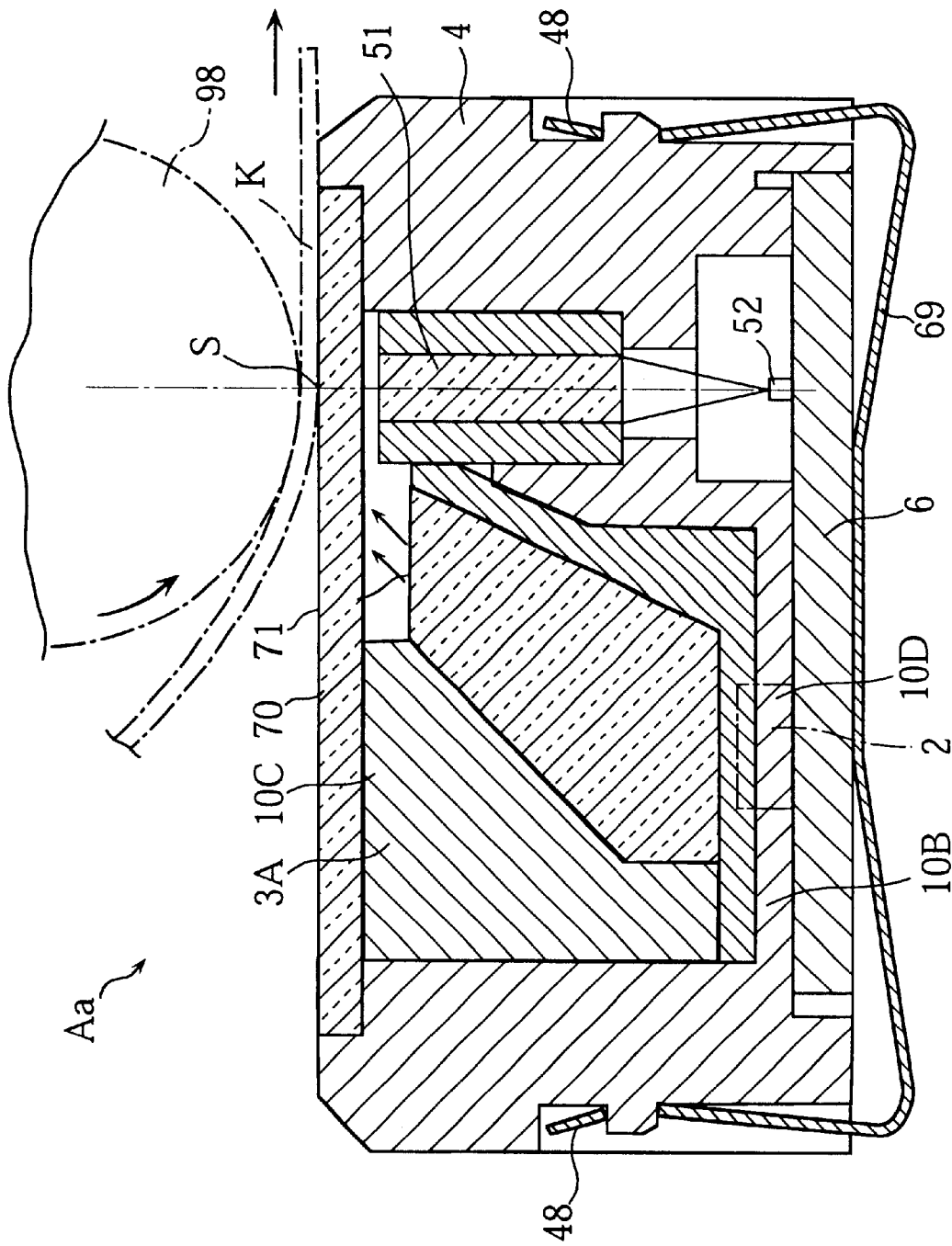
FIG. 8 shows, in section, a different type of image reading apparatus embodying the present invention.

FIG. 8 shows an image reading apparatus Aa of a different type (contact-type) incorporating the light-leading member 10 discussed above. The arrangement of the image reading apparatus Aa is basically the same as that of the image reading apparatus A. The difference is that a glass plate 70 of the apparatus Aa is directly supported by a housing 4. A platen roller 98 may be arranged in facing relation to th upper surface 71 of the glass plate 70 for transferring the document paper sheet K in the secondary scanning direction. However, when the apparatus Aa is used as a handheld-type device, the platen roller 98 is dispensed with.

According to the first embodiment, the bottom surface 10B is provided with semi-circular grooves 14 for scattering the light propagating through the light-leading member 10. However, in place of the grooves 14, the following arrangements are also possible.

Figure 9A:
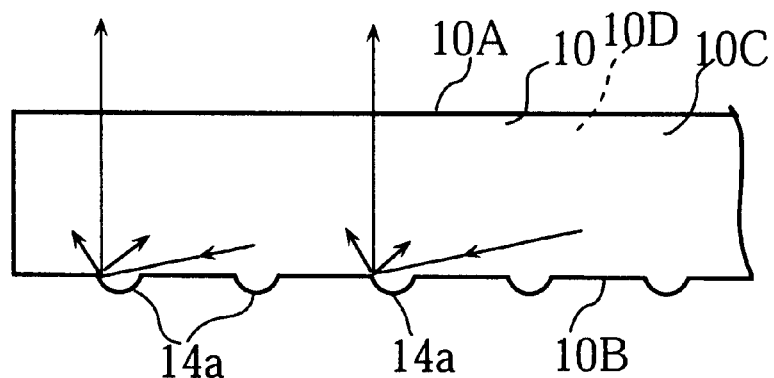
FIGS. 9A–9E show examples of light-scattering means provided in the bottom surface of the light-leading member.
Figure 9B:
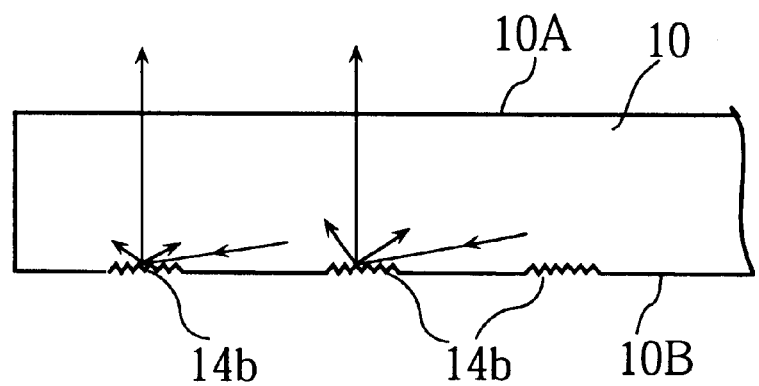
Figure 9C:
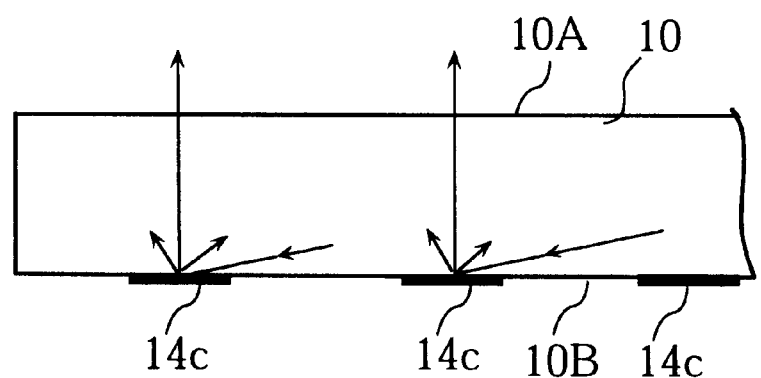
Figure 9D:
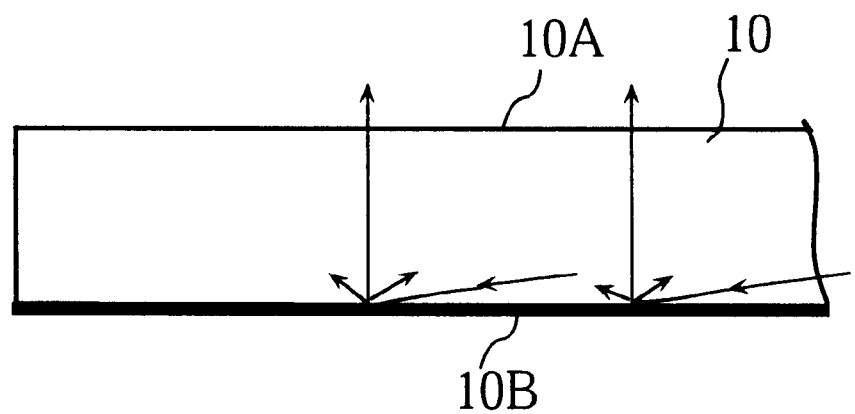
Figure 9E:
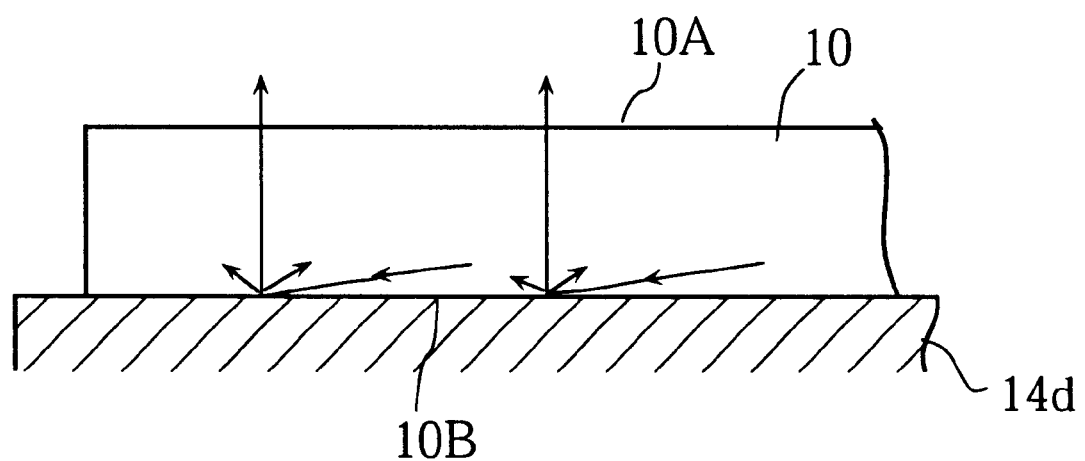

Referring to FIGS. 9A–9E, the bottom surface 10B may be provided with a plurality of protrusions 14a (FIG. 9A) or roughened portions 14b (FIG. 9B). It is also possible to apply reflective material, by plating, depositing or sputtering for example, at several locations 14c (FIG. 9C) or apply entirely over the bottom surface 10B (FIG. 9D). Further, a reflective support base 14d (FIG. 9E) may be held in contact with the bottom surface 10B.

Figure 10:
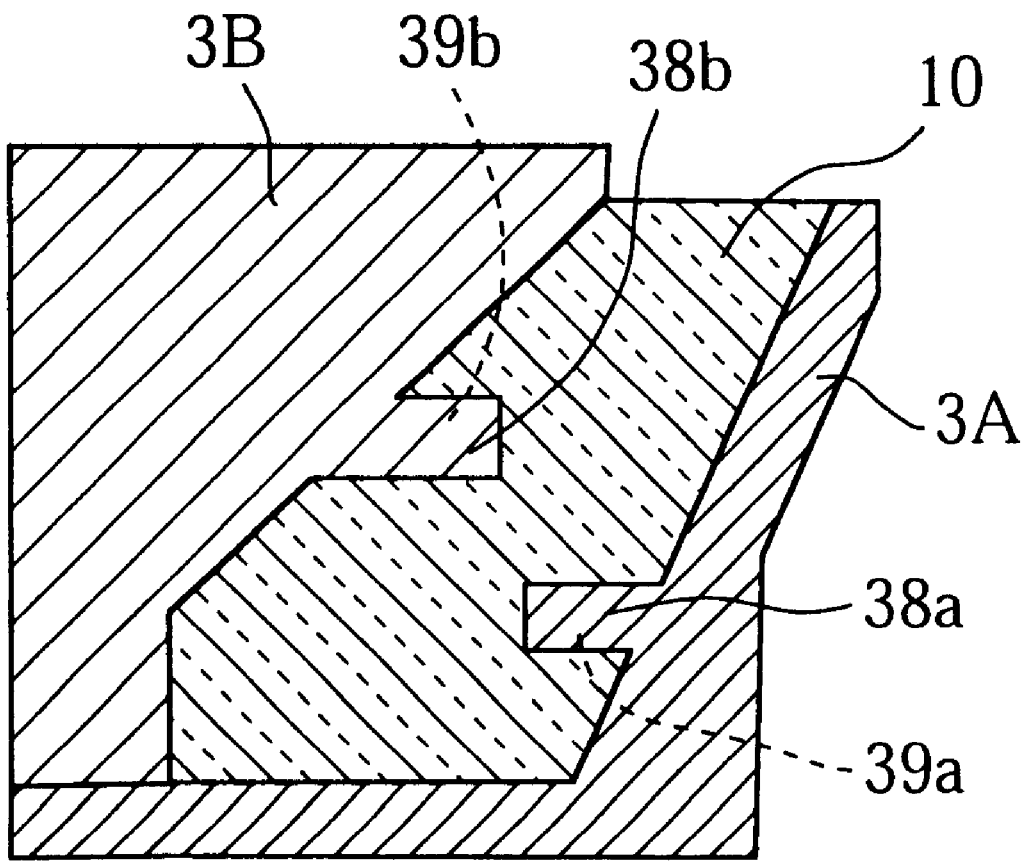
FIG. 10 illustrates an example of fixing arrangement for the light-leading member and reflection members.

FIG. 10 shows an example of fixing arrangement for the light-leading member 10 and the reflection members 3A–3B. In the illustrated example, the light-leading member 10 is formed with bores 39a–39b, while the reflection members 3A and 3B are provided with protrusions 38a and 38b, respectively. As illustrated, the protrusion 38a is fitted into the 39a, while the protrusion 38b into the bore 39b.

With such an arrangement, the light-leading member 10 is positionally secured to the first and second reflection members 3A–3B. Alternatively, it is also possible to provide the light-leading member 10 with protrusions, while the reflection members 3A–3B with bores.

Figure 11A:
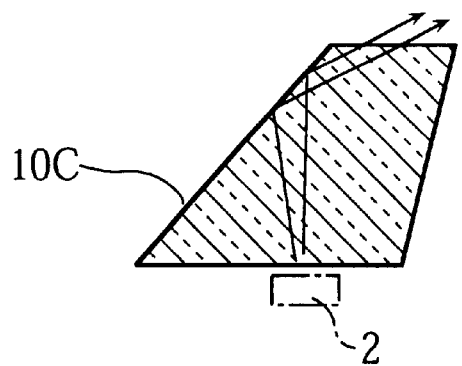
FIGS. 11A–11E illustrate examples of cross-section configuration of the light-leading member.

According to the first embodiment, the light-leading member 10 has a pentagonal cross section, as shown in FIG. 3. However, the present invention is not limited to this. For instance, as shown in FIG. 11A, the first side surface 10C may be a single, inclined plain with no vertical portion.

Figure 11B:
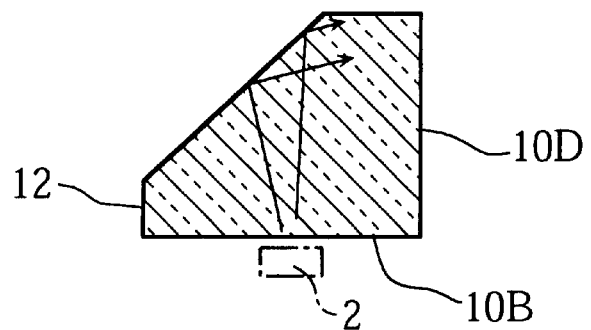

Further, as shown in FIG. 11B, the second side surface 10D may extend from the bottom surface 10B at the right angle, so that the second side surface 10D is parallel to the vertical portion 12 of the first side surface 10C.

Figure 11C:
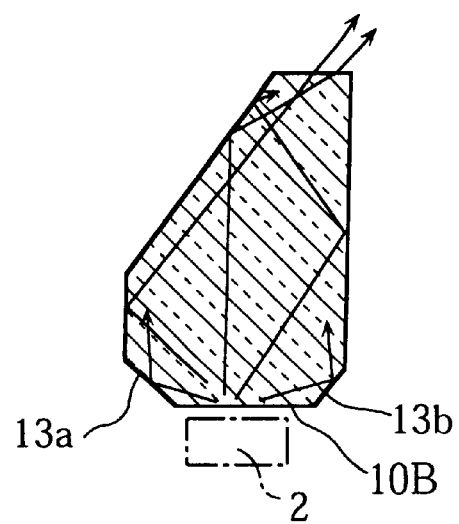
Figure 11D:
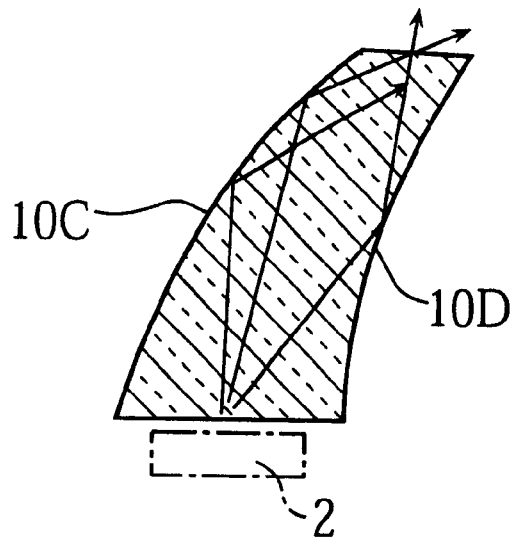
Figure 11E:
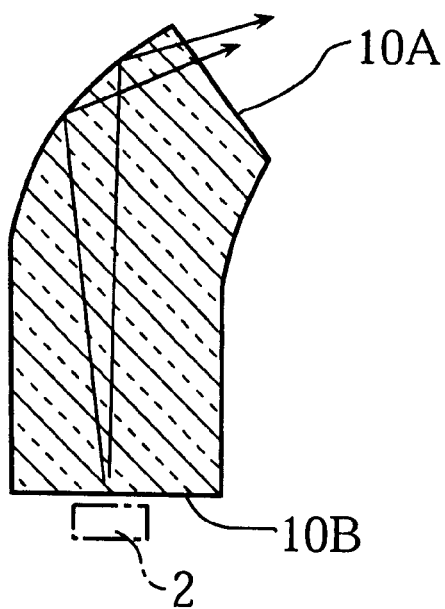
Figure 12:
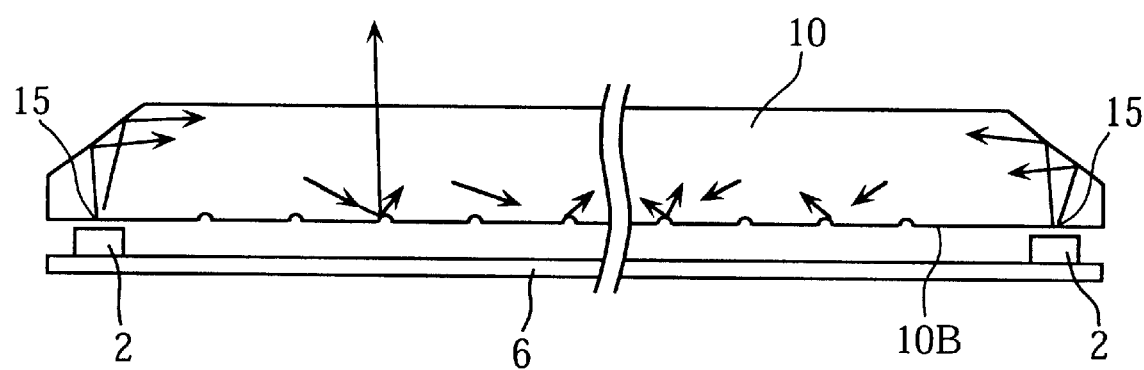
FIG. 12 shows a modified version of the light-leading member of the first embodiment.

Further, as shown in FIG. 11C, the light-leading member 10 may have a heptangular cross section. In the illustrated instance, additional two surfaces 13a and 13b, connected to the bottom surface 10B, are provided in an upwardly flaring manner. As shown in FIG. 11D, the first and second side surfaces 10C–10D may both be curved. As shown in FIG. 11D, the head surface 10A may not be parallel to the bottom surface 10B.

According to the present invention, use may be made of more than one light source. For instance, as shown in FIG.

12, two light sources 2 may be provided. In the illustrated instance, the bottom surface 10B of the light-leading member 10 are provided with two light-introducing portions 15 at it respective ends. The light sources 2 are arranged below th light-introducing portions 15, respectively.

Figure 13:
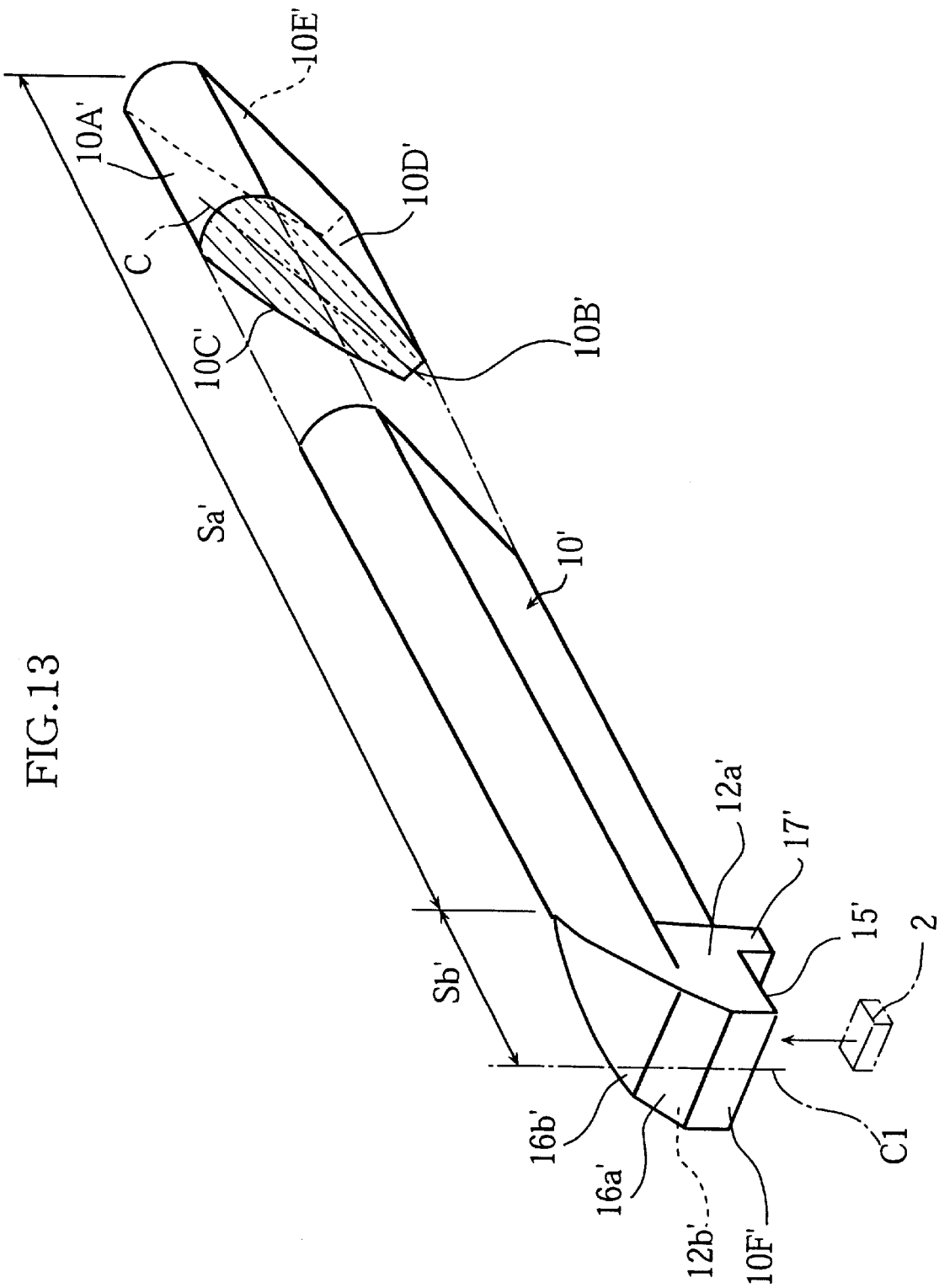
FIG. 13 is a perspective view showing a light-leading member used for an image reading apparatus according to the second embodiment of the present invention.
Figure 18:
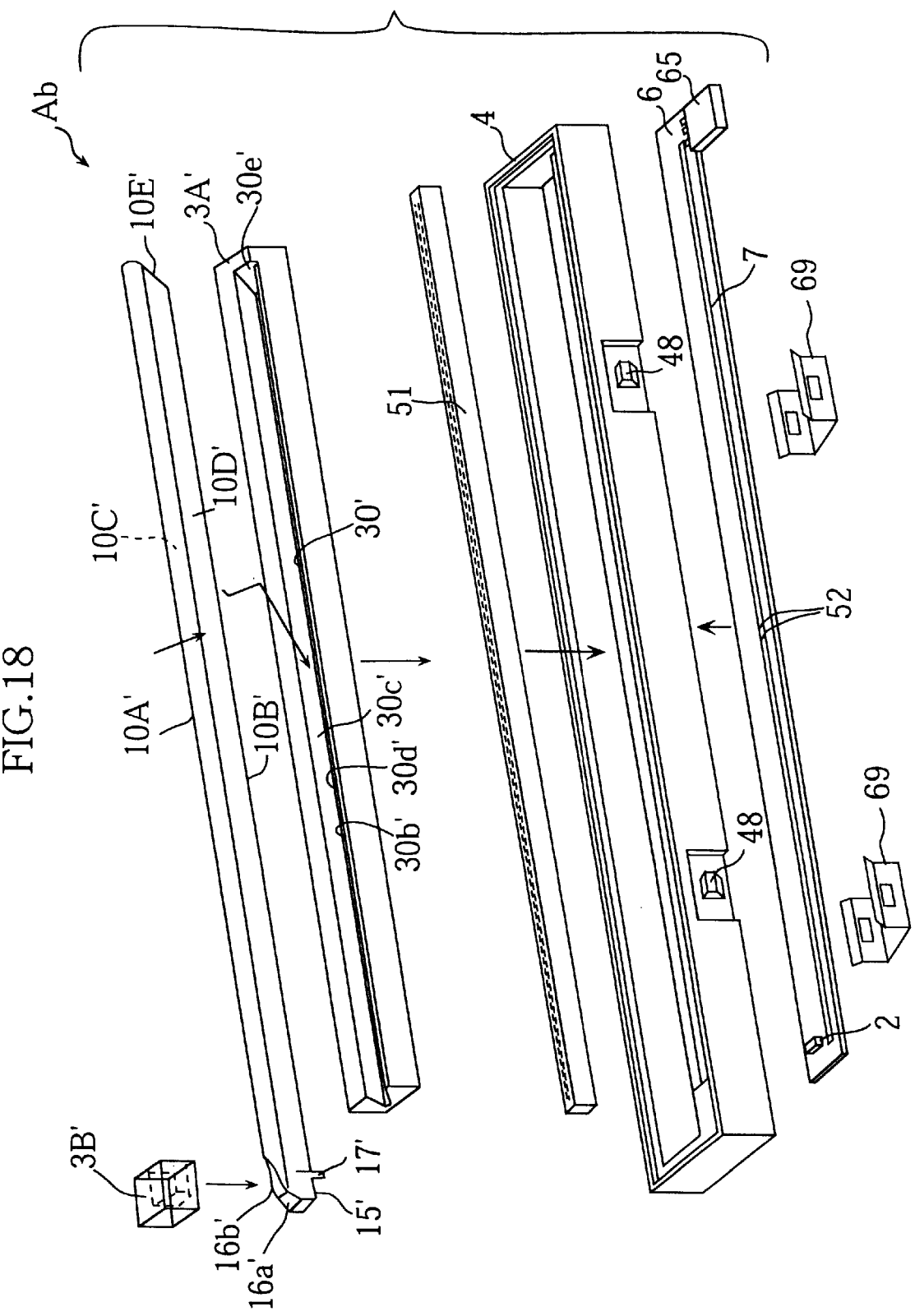
FIG. 18 is an explosive view showing the image reading apparatus of the second embodiment.

Reference is now made to FIGS. 13 and 18. Of these figures, FIG. 18 is an exploded view showing elements used for an image reading apparatus Ab according to a second embodiment of the present invention.

The image reading apparatus Ab is basically similar to the image reading apparatus A, as can be seen from comparison between FIG. 18 and FIG. 7. Thus, detailed description may not be made to the features of the second embodiment which are similar to or obvious from those of the first embodiment.

FIG. 13 is a perspective view showing an elongated light-leading member 10' advantageously incorporated in the image reading apparatus Ab. The light-leading member 10' may be made of a transparent resin material such as PMMA. As viewed longitudinally, the light-leading member 10' is divided into two sections Sa' and Sb'. The first section Sa' has a uniform cross section, whereas the cross section of the second section Sb' differs at positions.

The first section Sa' of the light-leading member 10' includes a head surface 10A', a bottom surface 10B' opposite to the head surface 10A', a first side surface 10C' and a second side surface 10D'. Like in the first embodiment, the head surface 10A', the first side side surface 10C' and the second side surface 10D' are rendered smooth. The bottom surface 10B' is provided with a plurality of grooves 14' for scattering light while also provided with smooth portions 13' between adjacent grooves 14' (see FIG. 15).

Figure 14:
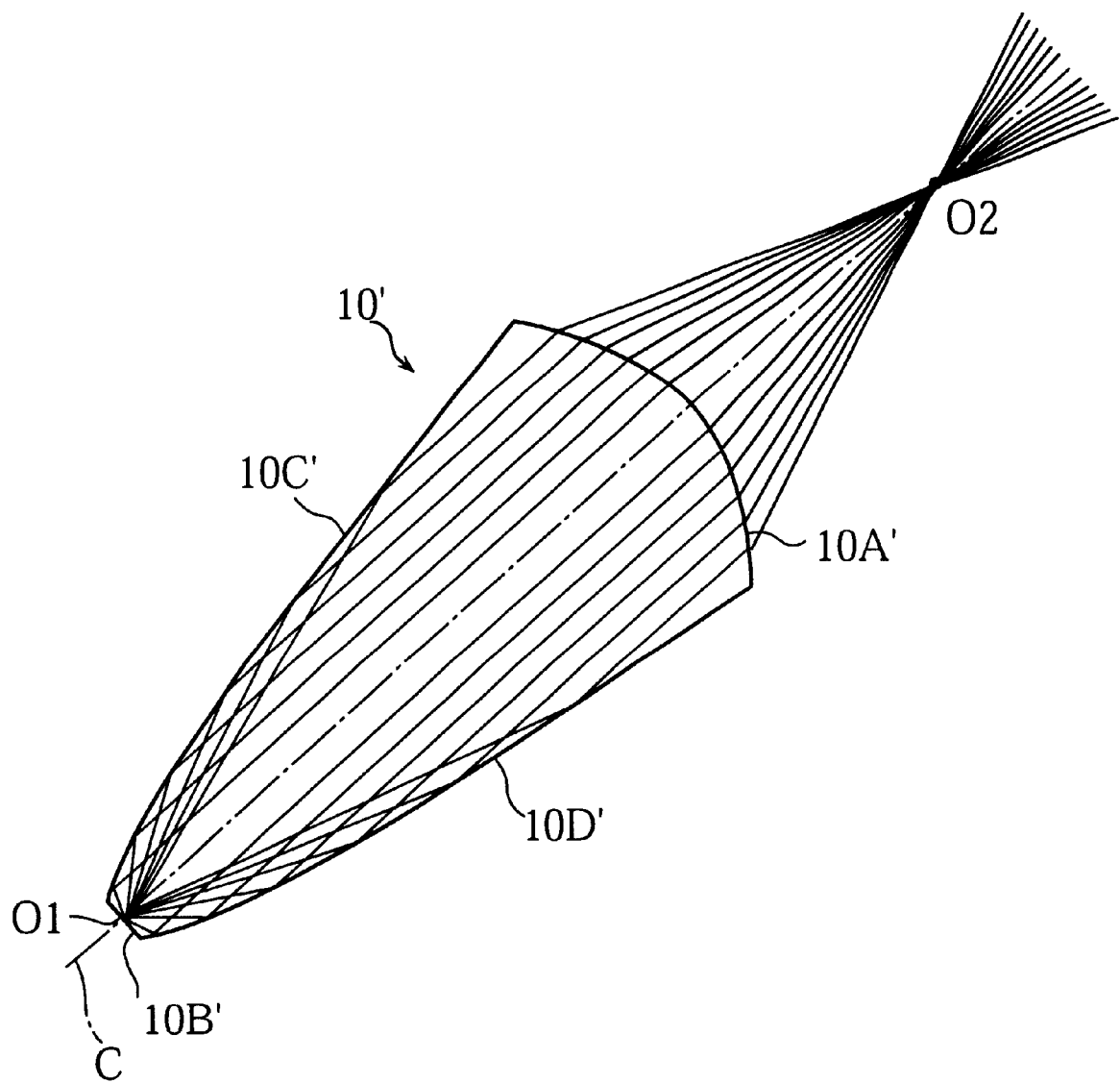
FIG. 14 is a cross-sectional view of the light-leading member shown in FIG. 13.

FIG. 14 is a cross-sectional view showing the light-leading member 10'. As illustrated, the head surface 10A', the first side surface 10C' and the second side surface 10D' are curved, whereas the bottom surface 10B' is flat.

More specifically, the head surface 10A' is shaped like a convex lens, so that light passing through the head surface 10A' will converge on a predetermined point O2. The first side surface 10C' and the second side surface 10D' are symmetrical with respect to a center line C, defining a parabolic configuration. The flat bottom surface 10B', which is much smaller in width than the head surface 10A', extends through or close to the focus O1 of the parabola.

With such an arrangement, light rays starting from the focus O1 will be reflected in the same direction when they meet the parabolic side surfaces 10C' and 10D'.

Referring back to FIG. 13, the light-leading member 10' includes a first end surface 10E' and a second end surface 10F' opposite to the first end surface 10E'. The second section Sb' of the light-leading member 10' has two inclined portions 16a' and 16b'. Of these portions, the first inclined portion 16a' is a plane connected to the second end surface 10F', whereas the second inclined portion 16b' is slightly curved (see also FIG. 15).

As can be seen from FIG. 13, the center line C of the first section Sa' is inclined with respect to a center line C1 which extends vertically through the second section Sb'.

The second section Sb' of the light-leading member 10' has a lower surface provided with a light-introducing portion 15'. Light emitted from a light source 2 enters the light-leading member 10' from the light-introducing portion 15'.

Figure 15:
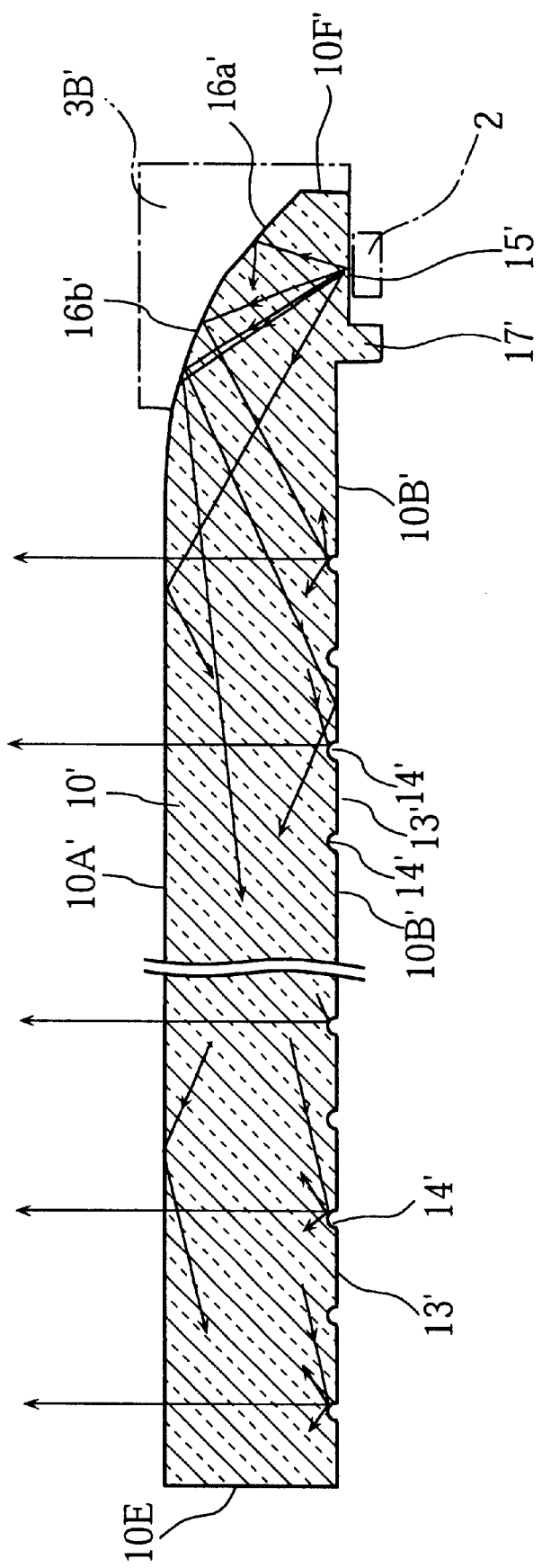
FIG. 15 is a longitudinal cross-sectional view of the light-leading member shown in FIG. 13.

As shown in FIG. 15, the first and second inclined portions 16a'–16b' are located above the light-introducing portion 15'. In the illustrated embodiment, the inclined portions 16a'–16b' and the second end surface 10F' are covered by a reflection block 3B' made of a white, reflective material. Thus, the light led into the light-leading member 10' from the light-introducing portion 15' will be effectively reflected in the longitudinal direction of the light-leading member 10'. Thereafter, like in the first embodiment, the light will propagate through the light-leading member 10' and be equally distributed within the light-leading member 10'.

In the illustrated embodiment, the reflection block 3B' is provided to cover the second end surface 10F' and inclined portions 16a'–16b'. However, in place of the reflection block 3B', a layer of a reflective material may be formed over the second end surface 10F' and inclined portions 16a'–16b' by plating, depositing or sputtering for example. Further, it is also possible to cover side portions 12a'–12b' (FIG. 13) of the second section Sb' with the reflection block 3B'.

As shown in FIG. 15, after reflected by the inclined portions 16a'–16b', the light will propagate through the light-leading member 10' longitudinally thereof, and be scattered by the grooves 14' of the bottom surface 10B'. Part of the scattered light will directly go out through the head surface 10A', whereas another part of it will first meet the first side surface 10C' or the second side surface 10D' (see also FIG. 14). As previously stated, the first and second side surfaces 10C'–10D' have a parabolic cross section. Therefore, light rays reflected by these surfaces 10C'–10D' will go in parallel to each other toward the head surface 10A' to eventually go out through the head surface 10A'. Then, the light rays are converged on the predetermined point O2 due to the head surface 10A'.

Figure 16:
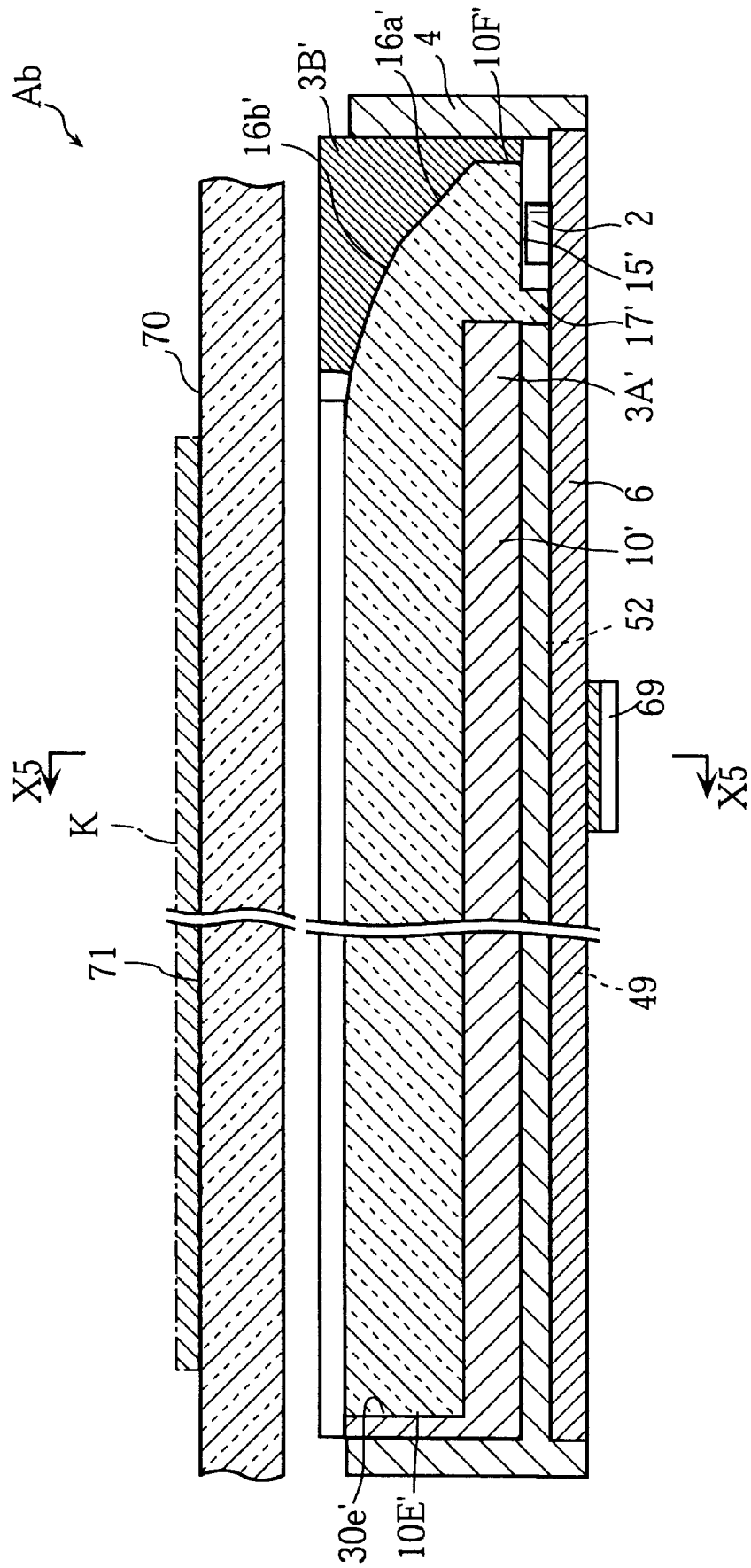
FIG. 16 shows, in section, the image reading apparatus of the second embodiment.
Figure 17:
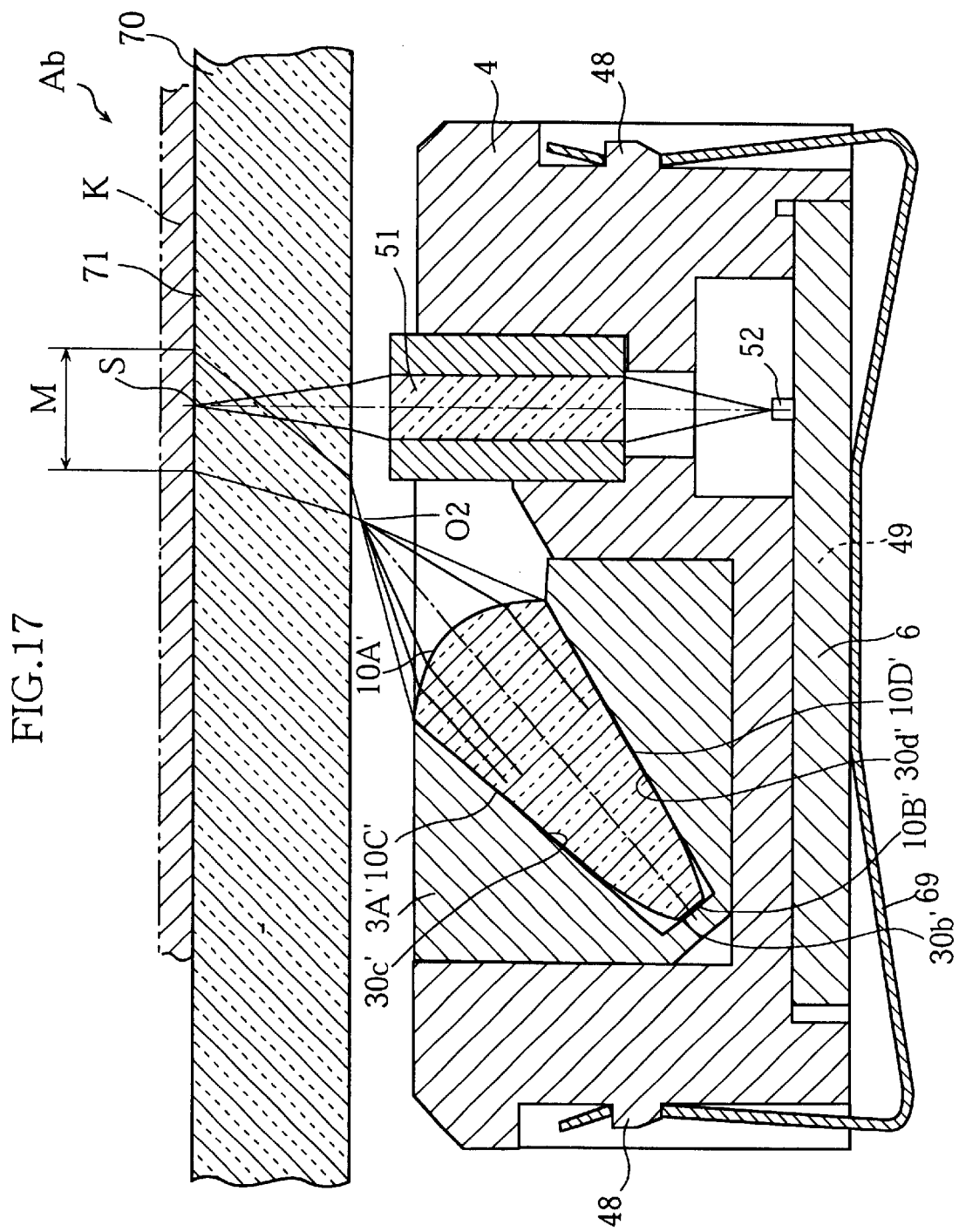
FIG. 17 is a sectional view taken along lines X5—X5 in FIG. 16.

FIGS. 16–17 are sectional views showing the image reading apparatus Ab. Of these figures, FIG. 16 illustrates a longitudinal section of the apparatus Ab, whereas FIG. 17 is a cross-sectional view taken along lines X5—X5 in FIG. 16.

As shown in FIGS. 17 and 18, the reflection member 3A' of the image reading apparatus Ab is formed with an elongated groove 30' for accommodating the first section Sa' of the light-leading member 10'. To this end, the groove 30' has a substantially V-shaped cross section.

More specifically, the groove 30' is defined by three inner surfaces, namely, a bottom surface 30b', a first side surface 30c' and a second side surface 30d'. As shown in FIG. 17, the bottom surface 30b' of the reflection member 3A' comes into contact with the bottom surface 10B' of the light-leading member 10'. The first side surface 30c' of the reflection member 3A' comes into contact with the first side surface 30C' of the light-leading member 10', while the second side surface 30d' of the reflection member 3A' with the second side surface 10D' of the light-leading member 10'.

The reflection member 3A' is also formed with a reflective, flat end wall 30e'. As best shown in FIG. 16, the end wall 30e' comes into contact with the first end surface 10E' of the light-leading member 10'. In this way, light propagating through the conductor 10' can be prevented from unduly going out from the end surface 10E'.

Referring to FIGS. 15 and 16, the light-leading member 10' is formed with a downward protrusion 17' adjacent to the light-introducing portion 15'. Thus, it is possible to accurately position the light-leading member 10' with respect to the circuit board 6.

According to the second embodiment, as shown in FIG. 17, the light coming out from the head surface 10A' is converged on the predetermined point O2 below the glass plate 70. Such an arrangement is advantageous in that the path of the converging light is not blocked by the lens array 51 nearby.

Further, the light once converged on the point O2 will begin to spread beyond the point O2. Thus, the readout section S is properly illuminated by the light with a widened range M.

Figure 19:
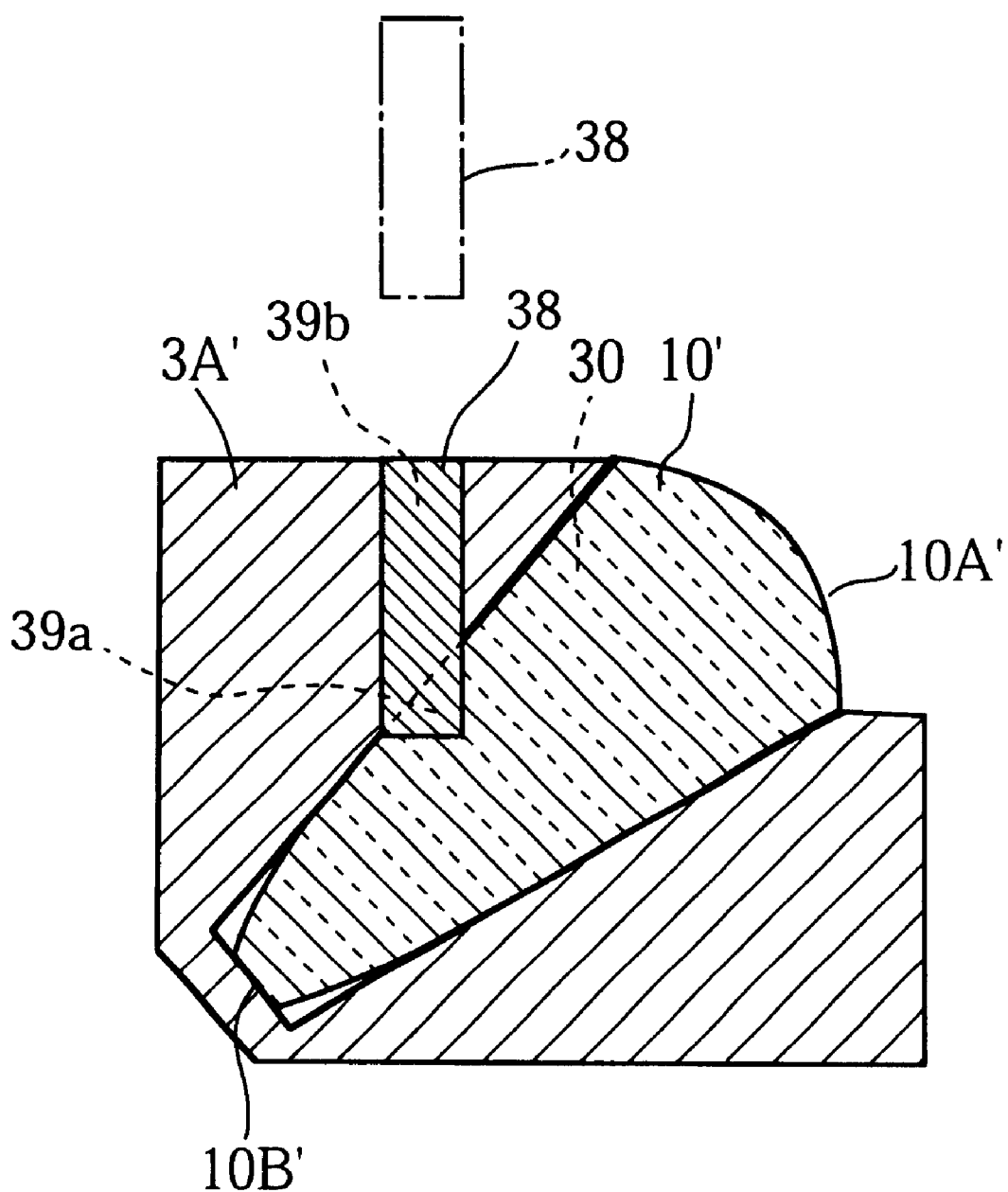
FIG. 19 shows an example of fixing arrangement for the light-leading member and reflection member of the second embodiment.

FIG. 19 shows an example of a fixing arrangement for the light-leading member 10' and reflection member 3A'. A bore 39' is formed to extend through the reflection member 3A' and partially into the light-leading member 10'. With such an arrangement, the light-leading member 10' is advantageously fixed to the reflection member 3A' by simply inserting a pin 38' into the bore 39'.

Figure 20:
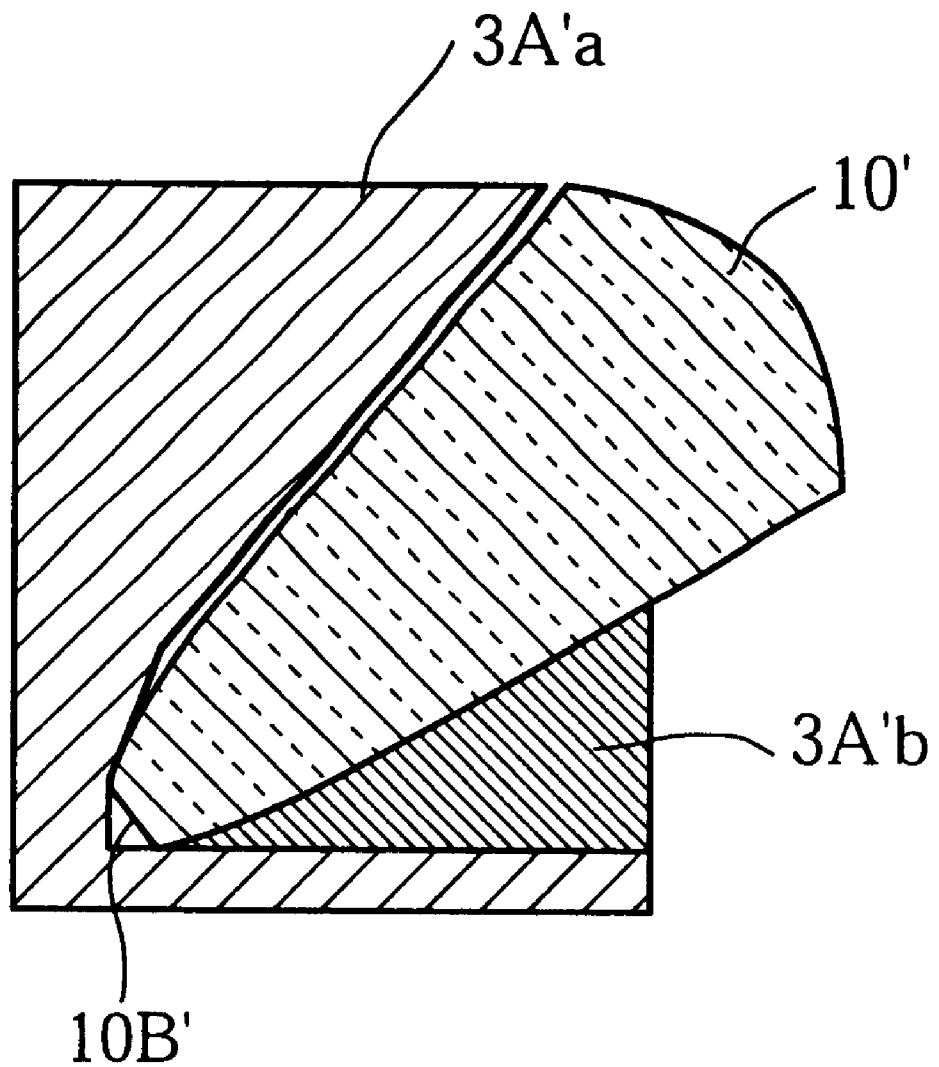
FIG. 20 shows a modified arrangement for the light-leading member of the second embodiment and reflection members.

In the illustrated embodiment, the reflection member 3A' is a one-piece member. However, as shown in FIG. 20, use may be made of two separate reflection members 3A'a and 3A'b.

Further, as shown in FIGS. 21A–21B, the head surface 10A' may be rendered flat. In this instance, a separate convex lens R may be arranged in front of the head surface 10A'.

Figure 22:
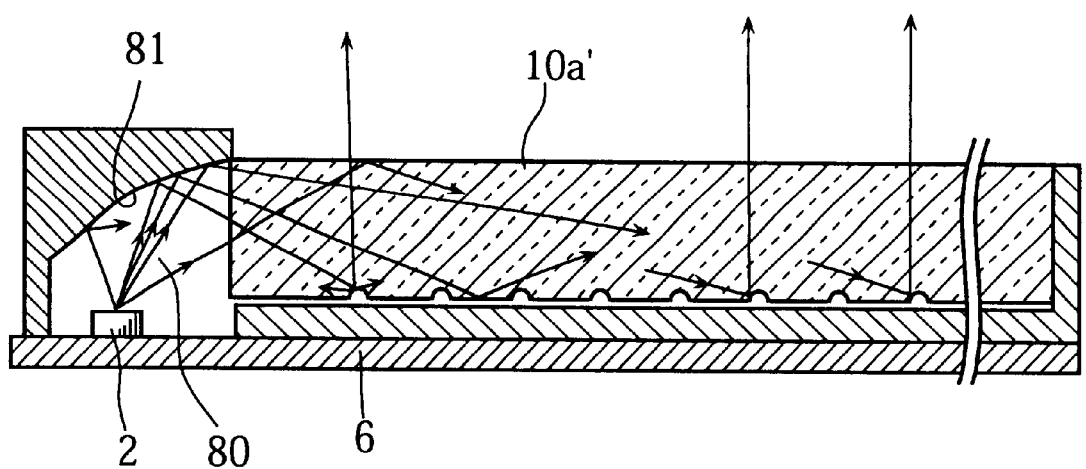
FIG. 22 shows a modified arrangement for the image reading apparatus of the second embodiment.

Further, an arrangement shown in FIG. 22 is also possible. In the illustrated arrangement, light rays emitted upward from a light source 2 will first go through an empty space 80 and then be reflected by a reflection member 81 toward an end portion of a light-leading member 10'a. Thereafter, the light will propagate through the light-leading member 10'a.

Figure 23:
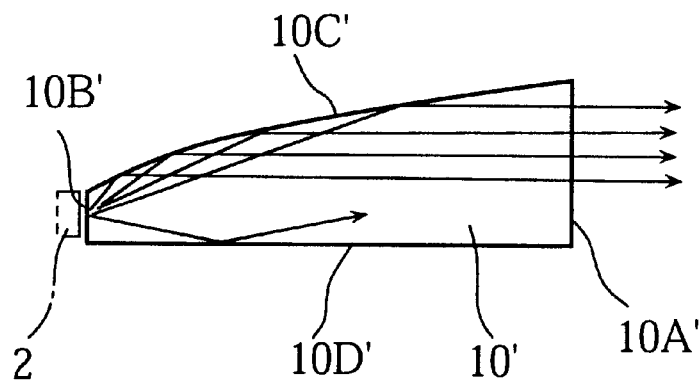
FIG. 23 shows another example of cross-sectional configuration for the light-leading member of the second embodiment.
Figure 24:
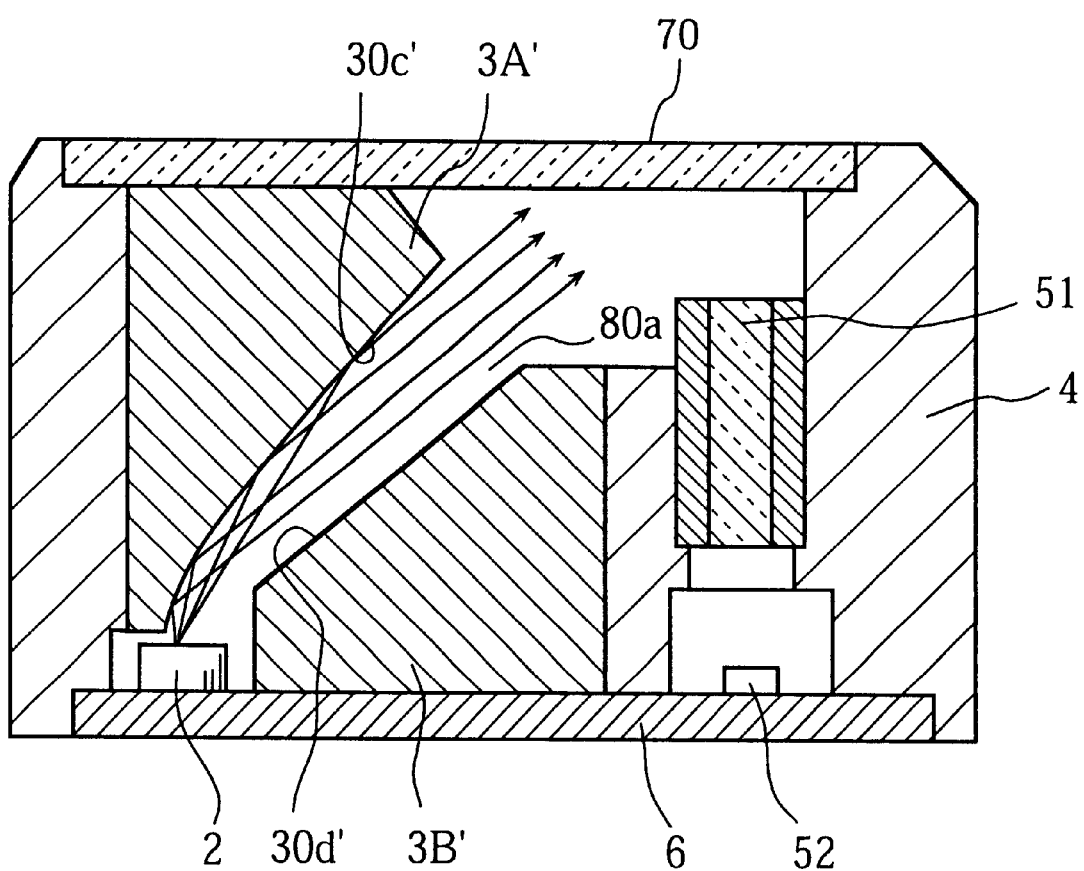
FIG. 24 shows another modified arrangement for the image reading apparatus of the second embodiment.

Still further, arrangements shown in FIGS. 23 and 24 are also possible. In the example shown in FIG. 23, the first side surface 10C' of the light-leading member 10' is the same as that shown in FIG. 14. However, the second side surface 10D' shown in FIG. 23 is a flat surface. The head surface 10A' shown in FIG. 23 is also flat.

In the example shown in FIG. 24, a light-leading member is not used. Instead, an empty space 80a is defined by an inner surface 30c' of the first reflection member 3A' and an inner surface 30d' of the second reflection member 3B'. As illustrated, the inner surface 30c' has an parabolic cross section, whereas the inner surface 30d' has a straight cross section.

Figure 25:
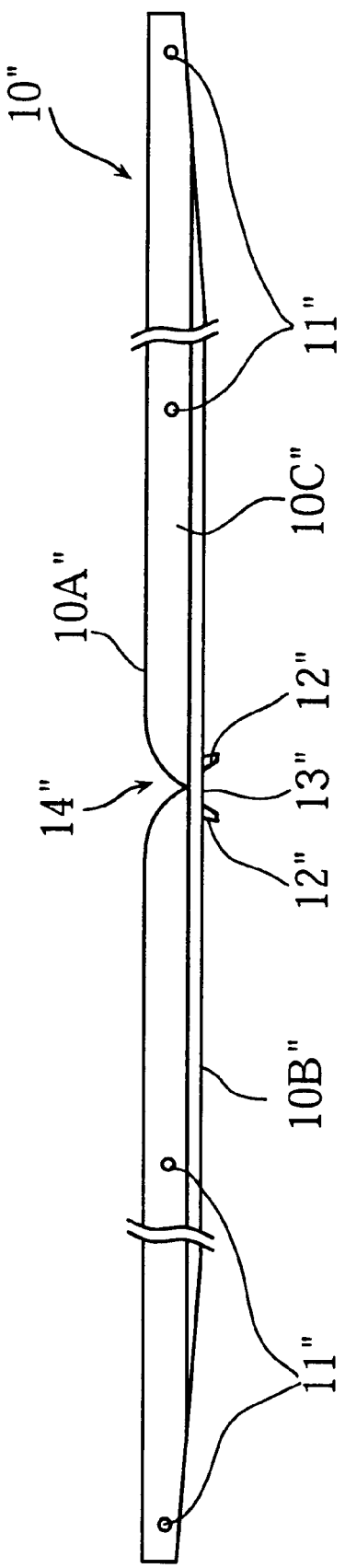
FIG. 25 is a front view showing a light-leading member used for an image reading apparatus according to the third embodiment of the present invention.
Figure 26:
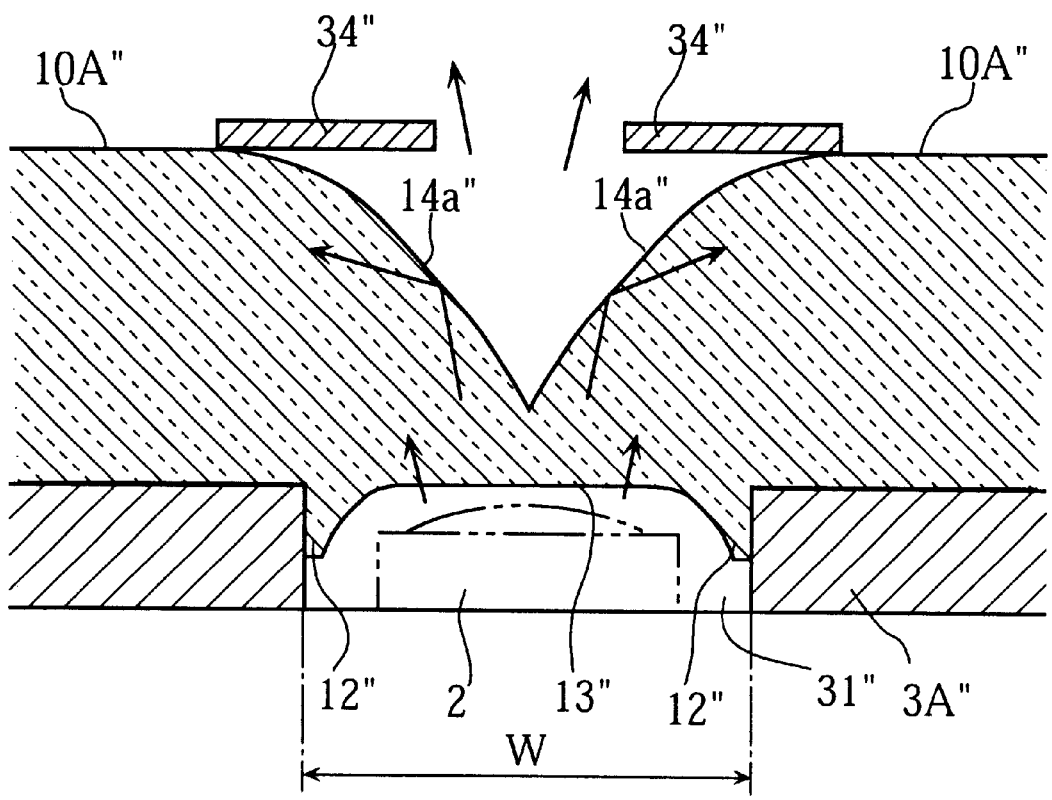
FIG. 26 is an enlarged view showing a central portion of the light-leading member of the third embodiment.
Figure 27:
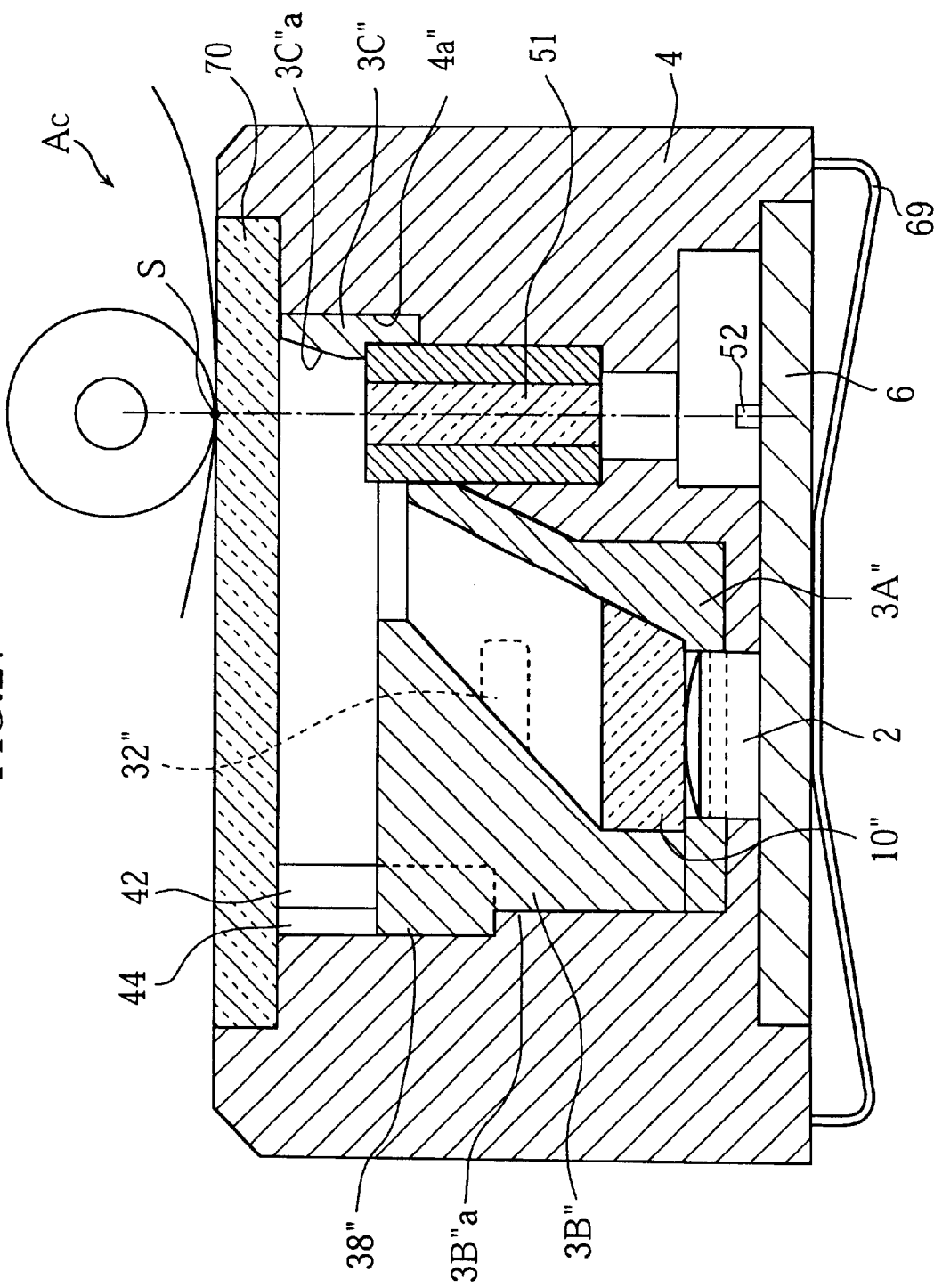
FIG. 27 shows, in section, the image reading apparatus of the third embodiment.
Figure 28:
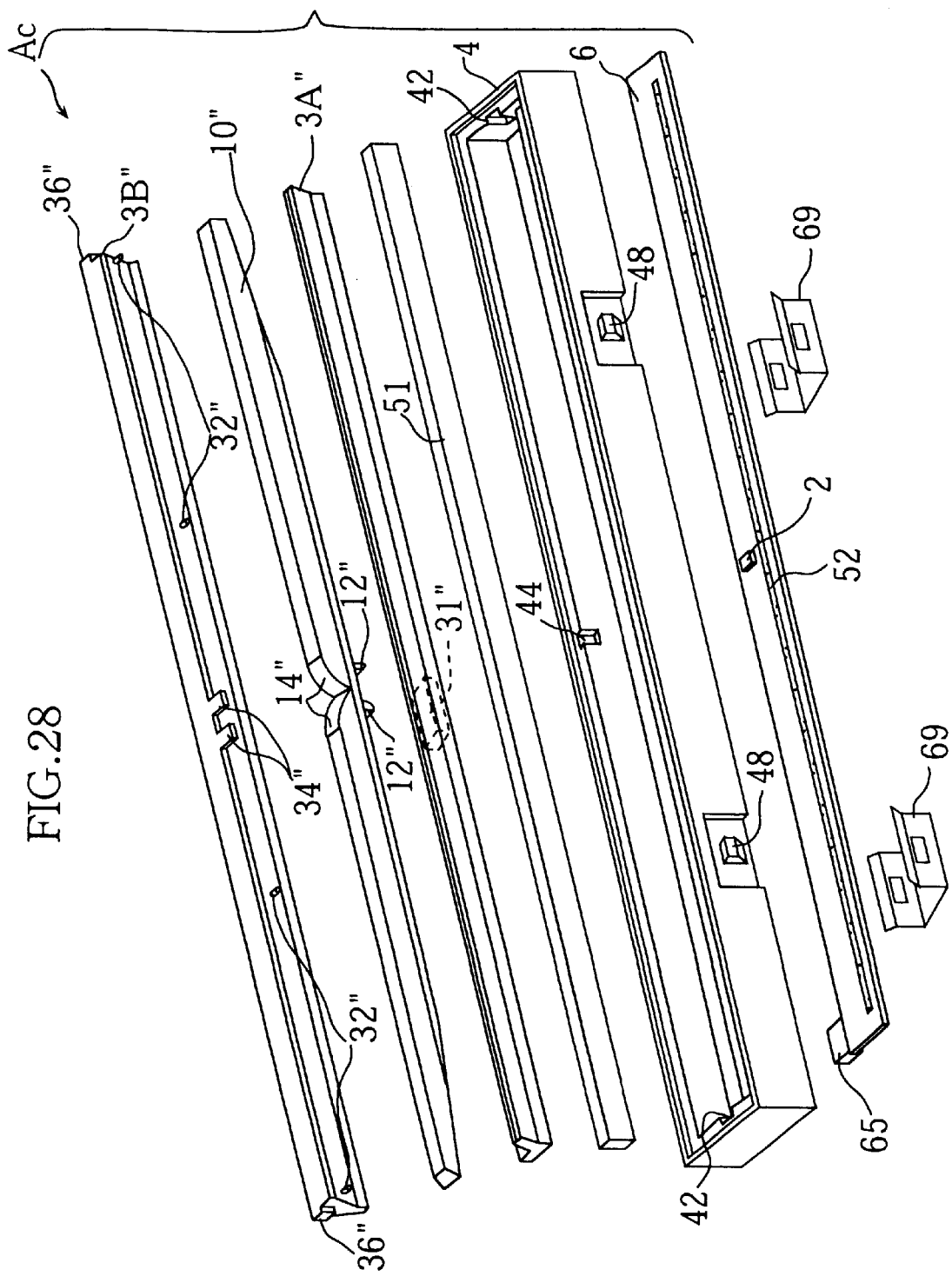
FIG. 28 is an explosive view showing the image reading apparatus of the third embodiment.

Reference is now made to FIGS. 25–28. Of these figures, FIG. 28 is an exploded view showing elements used for an image reading apparatus Ac according to a third embodiment of the present invention. FIG. 25 shows a light-leading member 10" incorporated in the image reading apparatus Ac, whereas FIG. 26 is an enlarged view showing a central portion of the light-leading member 10". As illustrated in FIG. 28, the image reading apparatus Ac includes a first reflection member 3A", a second reflection member 3B", and so forth.

As can be seen from FIG. 27, the image reading apparatus Ac is similar to the apparatus A illustrated in FIG. 5. Thus, detailed description may not be made to the features of the third embodiment which are similar to or obvious from those of the first embodiment.

As shown in FIG. 28, according to the third embodiment, a light source 2 is arranged in a central portion of a printed circuit board 6. Correspondingly, the light-leading member 10" has the following arrangements.

As shown in FIG. 25, the light-leading member 10" is provided with a light-introducing portion 13" in the center of the bottom surface 10B".

Further, the light-leading member 10" is formed with a substantially V-shaped recess 14" above the light-introducing portion 13". As best shown in FIG. 26, the V-shaped recess 14" is defined by two curved portions 14a". The curved portions 14a" are rendered smooth enough so that light emitted by the light source 2 is properly reflected by them in the longitudinal direction of the light-leading member 10".

However, no matter how smooth the curved portions 14a" may be made, light tends to go out from the curved portions to a greater extent than any other portion of the head surface 3A", since the light source 2 is arranged right below the curved portions 14".

To reduce the above imbalance, according to the third embodiment, barrier wings 34" are arranged above the V-shaped recess 14" for light-shielding. However, light should not be totally blocked by the barrier wings 34". Thus, as shown in FIG. 26, the barrier wings 34" are spaced from each other by a predetermined distance. In the illustrated embodiment, the barrier wings 34" are integrally formed with the second reflection member 3B", as seen from FIG. 28. Other arrangements may be possible.

As shown in FIGS. 25 and 26, the bottom surface 10B" is formed with a pair of downwardly protruding legs 12" flanking the light-introducing portion 13". Correspondingly, as shown in FIGS. 26 and 28, the first reflection member 3A" is formed with a through-hole 31" for receiving the legs 12" of the light-leading member 10". As best shown in FIG. 26, the maximum distance between the two legs 12" is substantially equal to or slightly greater than the width (W) of the through-hole 31". Thus, when the legs 12" are fitted into the through-hole 31", the light-leading member 10" is positionally secured to the first reflection member 3A".

Further, as shown in FIG. 25 or 28, the side surface 41C" of the light-leading member 10" is formed with four bores 11" spaced from each other by predetermined distances. Correspondingly, the second reflection member 3B" is provided with four projections 32". With such an arrangement, it is possible to positionally secure the second reflection member 3B" to the light-leading member 10" by simply fitting the protrusions 32" into the corresponding bores 11".

Therefore, in the third embodiment, the light-leading member 10", the first reflection member 3A" and the second reflection member 3B" are advantageously secured in position to each other.

Further, as shown in FIG. 28, the second reflection member 3B" is formed with a projection 36" at each longitudinal end, and with a projection 38" at the center of an outer surface 3B"a (see FIG. 27). Correspondingly, the housing 4 is provided with cutouts 42 for receiving the projections 36" while also provided with a cutout 44 for receiving the central projection 38".

With such an arrangement, the second reflection member 3B" (and together with the light-leading member 10" and the first reflection member 3A") can be accommodated in the housing 4 without being unduly displaced with respect to the housing 4.

According to the third embodiment, as shown in FIG. 27, a reflection member 3C" is additionally provided at a position opposite to the cutout 44 for covering an inner wall 4a" of the housing 4. As illustrated, the third reflection member 3C– is held in contact with the top end of a lens array 51 and with a glass plate 70. The third reflection member 3C" has a reflective inner surface 3C"a which is slightly inclined toward an image-reading section S. With such an arrangement, light rays which would otherwise be absorbed by the inner wall 4a" will be reflected toward the image-reading section S.

In the illustrated embodiment, the V-shaped recess 14" formed in the center of the head surface 10A" is not covered with any reflecting means.

Figure 29A:
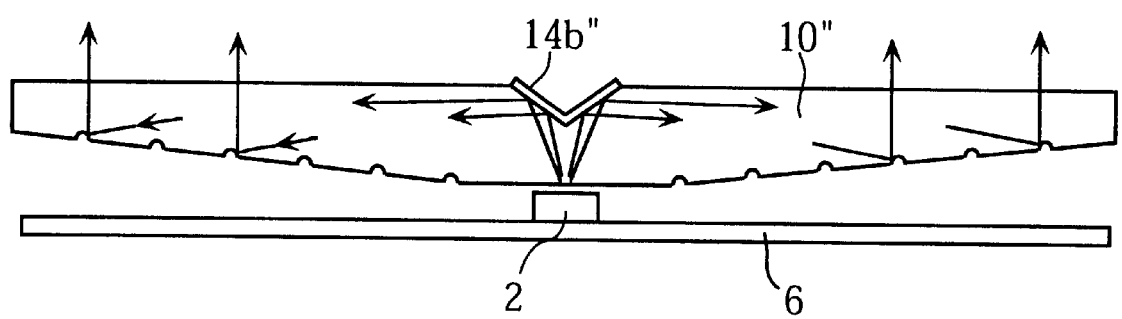
FIGS. 29A–29C show possible examples of arrangements for the light-leading member of the third embodiment.

However, as shown in FIG. 29A, a suitable reflective plate 14b" may be provided for covering the V-shaped recess 14" so that light emitted from the light source 2 is effectively reflected in the longitudinal direction of the light-leading member 10".

Figure 29B:
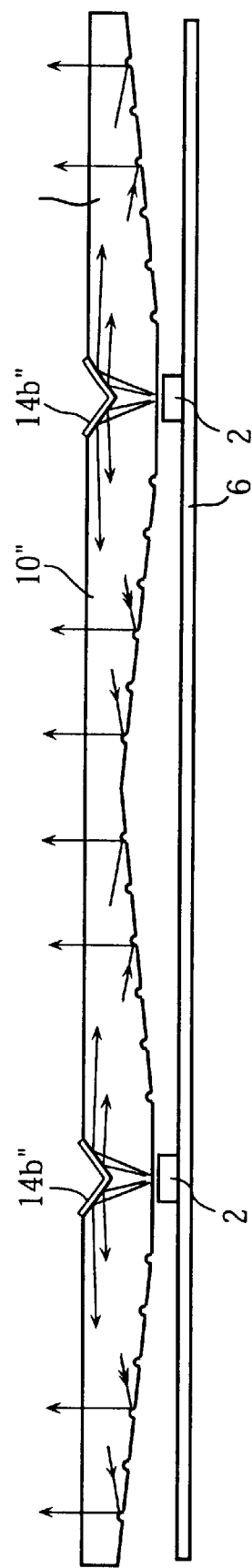

Further, an arrangement shown in FIG. 29B is also possible. In the illustrated example, two light sources 2 are mounted on the circuit board 6, and two V-shaped reflective plates 14b" are attached to the light-leading member 10" at positions corresponding to the light sources 2, respectively.

Figure 29C:
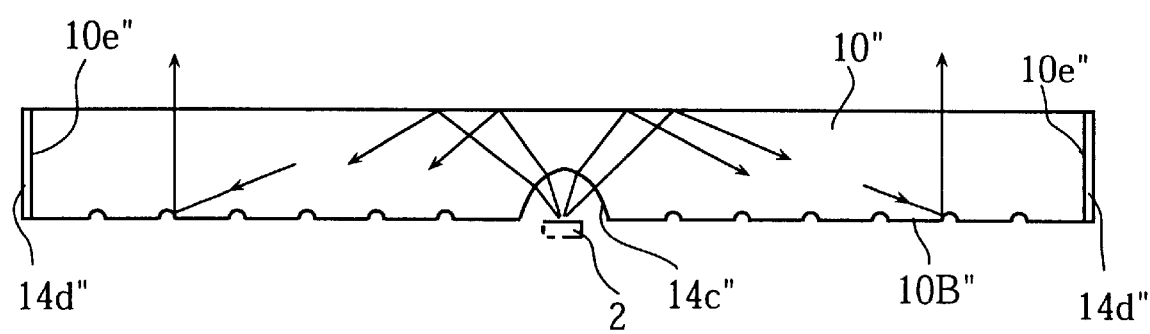

Still further, as shown in FIG. 29C, an arcuate groove 14c" may be formed in the center of the bottom surface 10B" of the light-leading member 10". A light source 2 is arranged below the arcuate groove 14c". In this example, both end surfaces 10e" of the light-leading member 10" are covered with reflective plates 14d".

Figure 31:
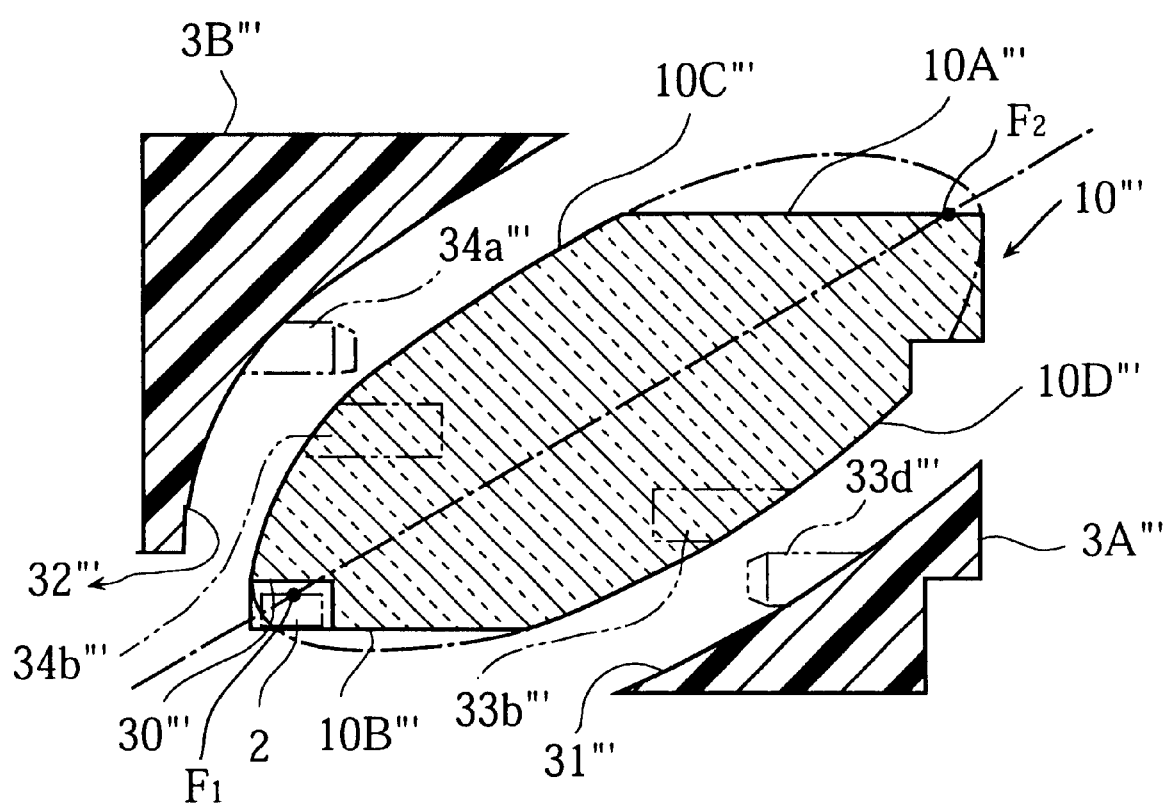
FIG. 31 is a sectional view taken along lines X6—X6 in FIG. 30.
Figure 32:
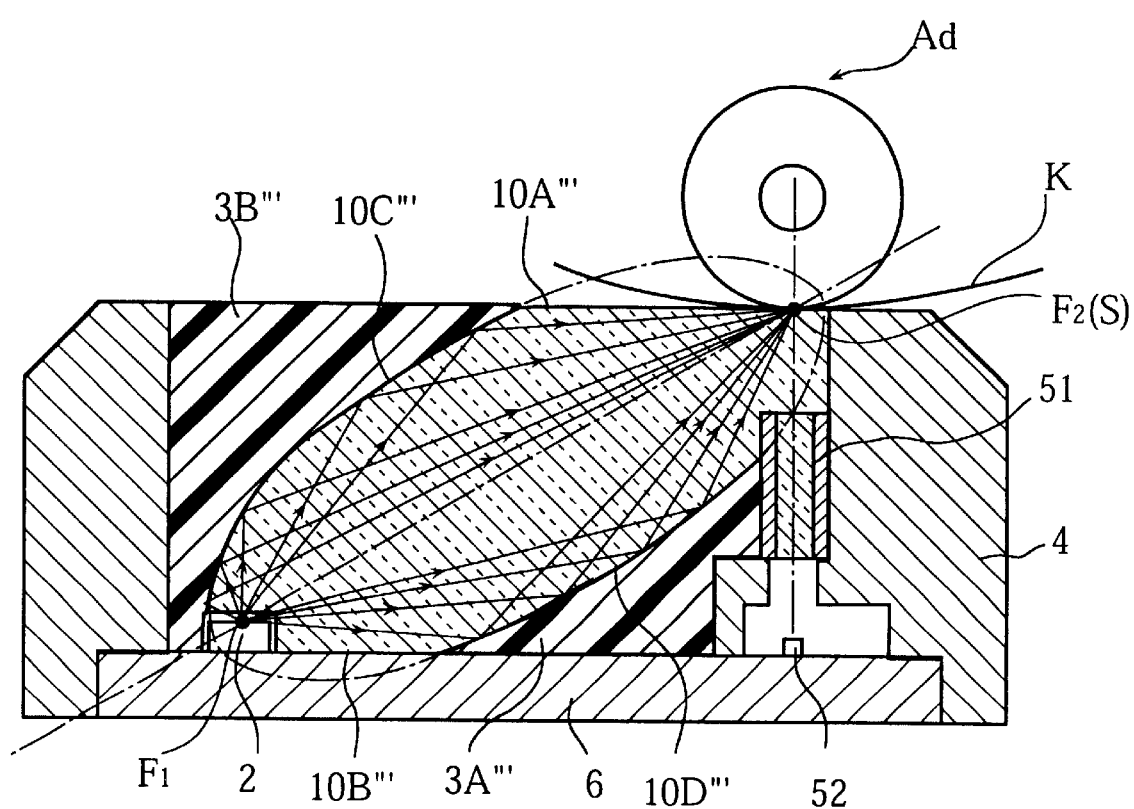
FIG. 32 shows, in section, the image reading apparatus c the fourth embodiment.
Figure 33:
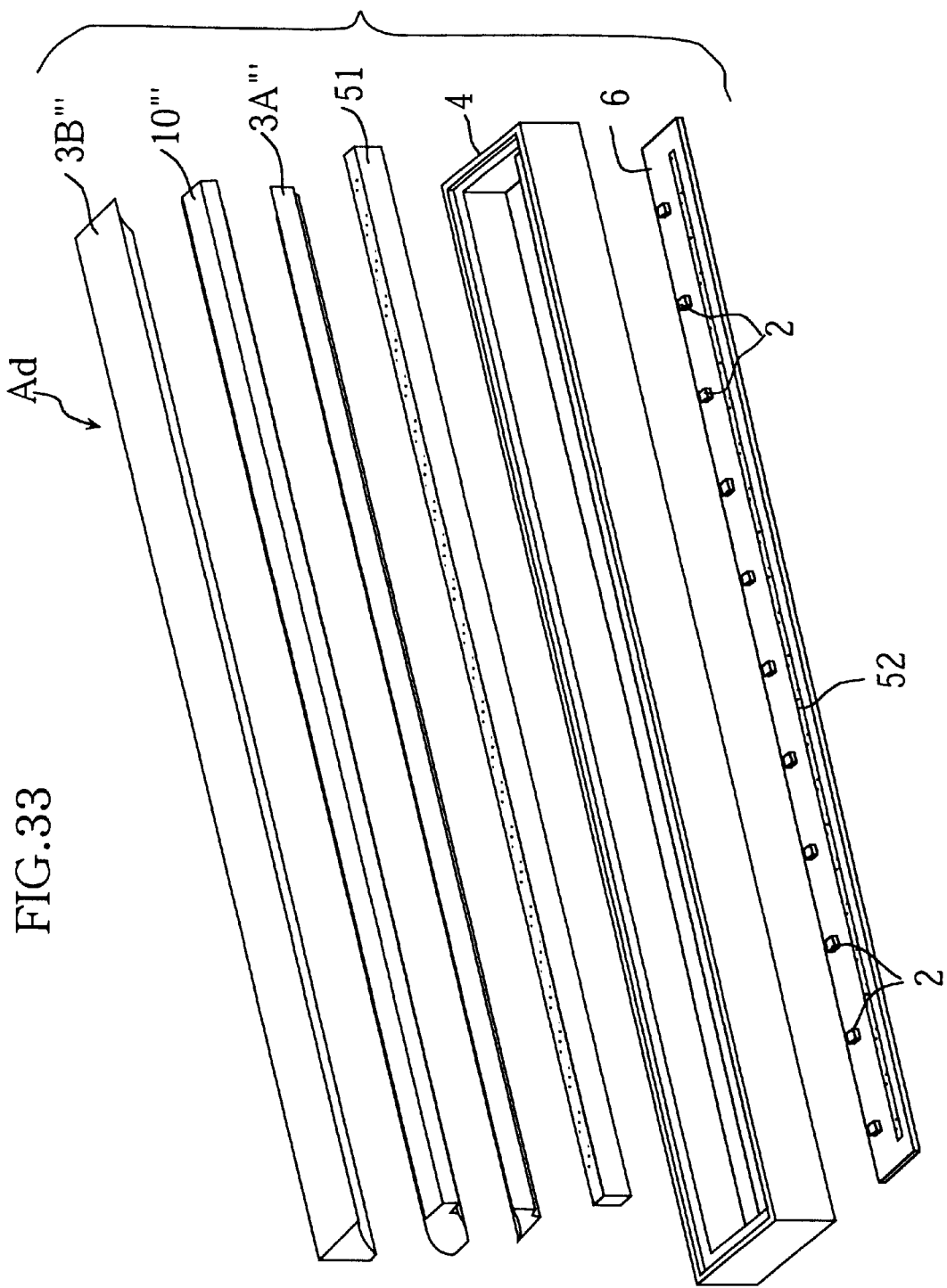
FIG. 33 is an explosive view showing the image reading apparatus of the fourth embodiment.

Reference is now made to FIGS. 30–33. Of these figures, FIG. 33 is an explosive view showing elements used for an image reading apparatus Ad according to a fourth embodiment of the present invention. The image reading apparatus Ad includes a light-leading member 10''', a first reflection member 3A''', a second reflection member 3B'''.

As illustrated, the image reading apparatus Ad also includes a plurality of light sources 2 mounted on a printed circuit board 6. These light sources 2 are spaced from each other at predetermined intervals longitudinally of the printed circuit board 6. The circuit board 6 also carries a plurality of image sensor chips 52.

Figure 30:
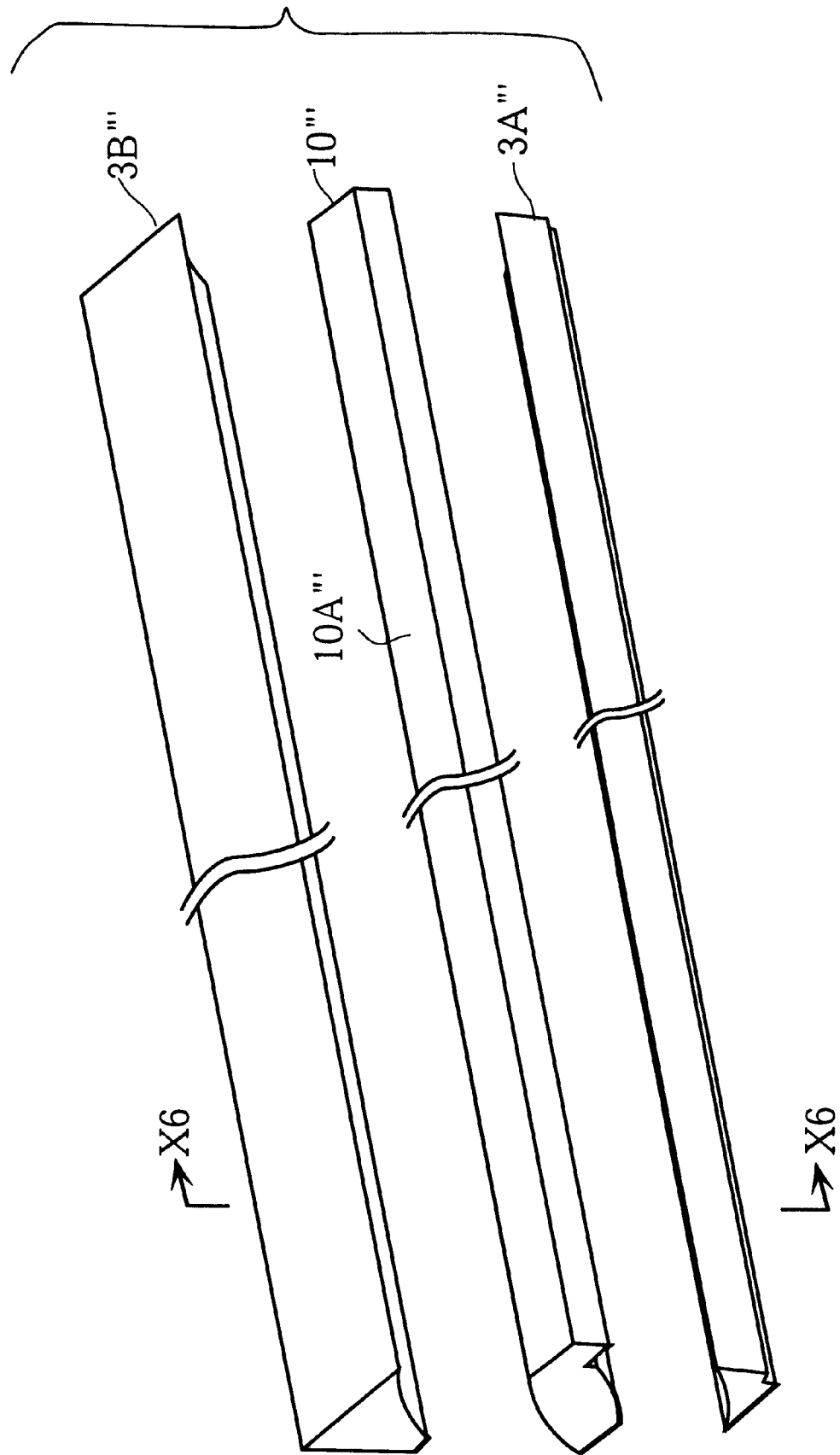
FIG. 30 is a perspective view showing a light-leading member and a pair of reflection members used for an image reading apparatus according to a fourth embodiment of the present invention.

FIG. 30 is an enlarged view showing the light-leading member 10''', the first reflection member 3A''', and the second reflection member 3B'''. FIG. 31 is a sectional view taken along lines X6—X6 in FIG. 30.

As best shown in FIG. 31, the light-leading member 10''' has a head surface 10A''' and a bottom surface 10B''' extending in parallel to the head surface 10A'''. These two surfaces are flat, except that the bottom surface 10B''' is formed with a plurality of recesses 30''' for accommodating the light sources 2 (only one is shown in FIG. 31). In this embodiment again, the bottom surface 10B''' is a roughened surface, so that light meeting the bottom surface 10B''', will be properly scattered.

Further, the light-leading member 10''' has a pair of curved surfaces, namely, a first side surface 10C''' and a second side surface 10D'''. According to the illustrated embodiment, the pair of first and second side surfaces 10C'''–10D''' has an elliptic cross section (or substantially elliptic cross section, with an upper and a lower portion of the complete ellipse being removed).

Here, it should be noted that any ellipse has two internal points called focuses or foci. As is well known in the field of mathematics or physics for example, a ray of light starting from one of the foci will pass through the other focus after it is reflected by the ellipse. The result is the same, no matter in what direction the light ray is initially directed.

Like any other ellipse, the ellipse defined by the first and second side surfaces 10C'''–10D''' has two focuses F1 (first focus) and F2 (second focus), as shown in FIG. 31. The light source 2 is positioned at or adjacent to the first focus F1.

The first reflection member 3A''' includes an inner surface 31''' having the same elliptic cross section as the second side surface 10D''' of the light-leading member 10'''. Similarly, the second reflection member 3B''' includes an inner surface 32''' having the same elliptic cross section as the first side surface 10C''' of the light-leading member 10'''. Thus, the first and second reflection members 3A'''–3B''' will come into close contact with the light-leading member 10''' in a sandwiching manner.

The first reflection member 3A''' is provided with protrusions 33a''' (only one is shown in FIG. 31) extending horizontally from the inner surface 31'''. The second reflection member 3B''' is provided with protrusions 34a''' (only one is shown) extending horizontally from the inner surface 32'''. Correspondingly, the light-leading member 10''' is formed with engaging bores 33b''' and 34b''' for receiving the protrusions 33a''' and 34a''', respectively.

With such an arrangement, the light-leading member 10''' is positionally secured to the first and second reflection members 3A'''–3B'''.

As shown in FIG. 32, when light emitted from the light source 2 is reflected by the first side surface 10C''' or second side surface 12D''', the rays will be converged on the second focus F2.

According to the illustrated embodiment, the image-reading portion S of the image reading apparatus Ad is arranged to positionally correspond to the second focus F2. Thus, a document paper sheet K is advantageously illuminated with a sufficient amount of light.

Figure 34:
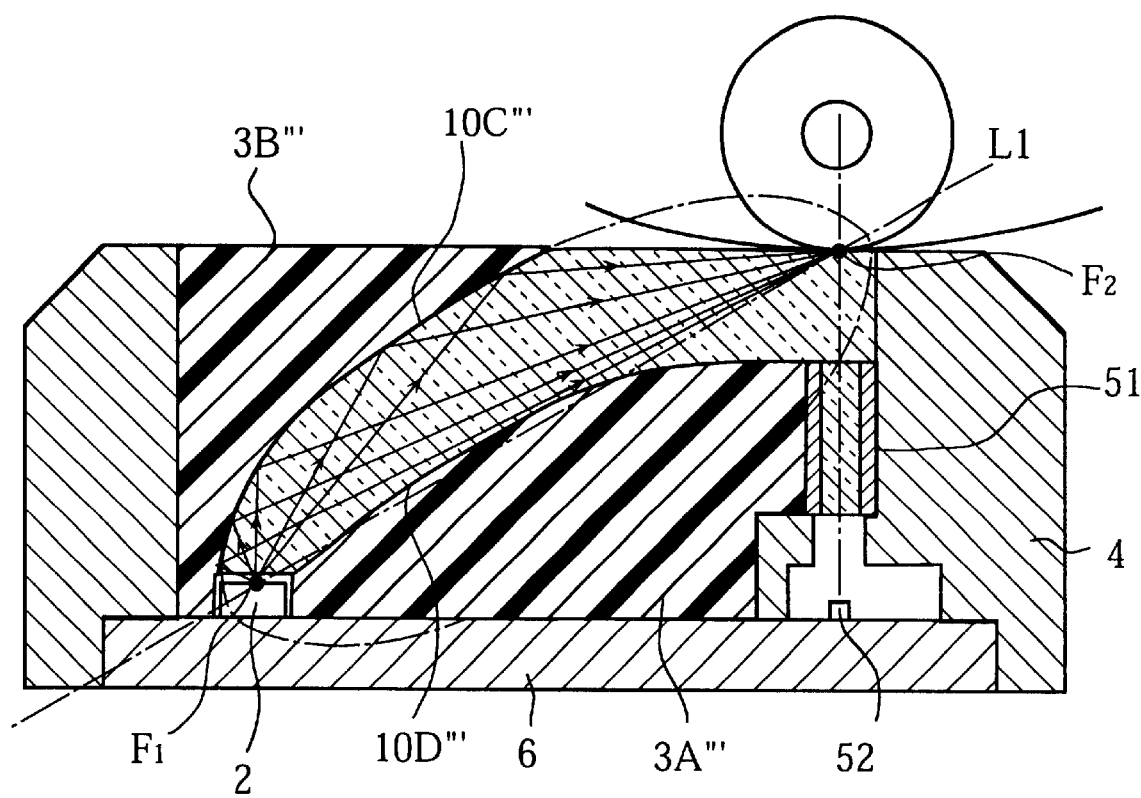
FIG. 34 shows a modified version of the image reading apparatus of the fourth embodiment.

The cross sectional configuration of the light-leading member 10''' is not to limited to the one discussed above. For instance, as shown in FIG. 34, only the side surface 10C''' may be elliptic while the other side surface 10D''' is differently curved. The second side surface 10D''' bulges toward the first side surface 10C' slightly beyond the single-dot chain line L1 connecting the foci F1 and F2. With such an arrangement, the light emitted from the light source 2 is prevented from directly arriving at the focus F2.

Figure 35A:
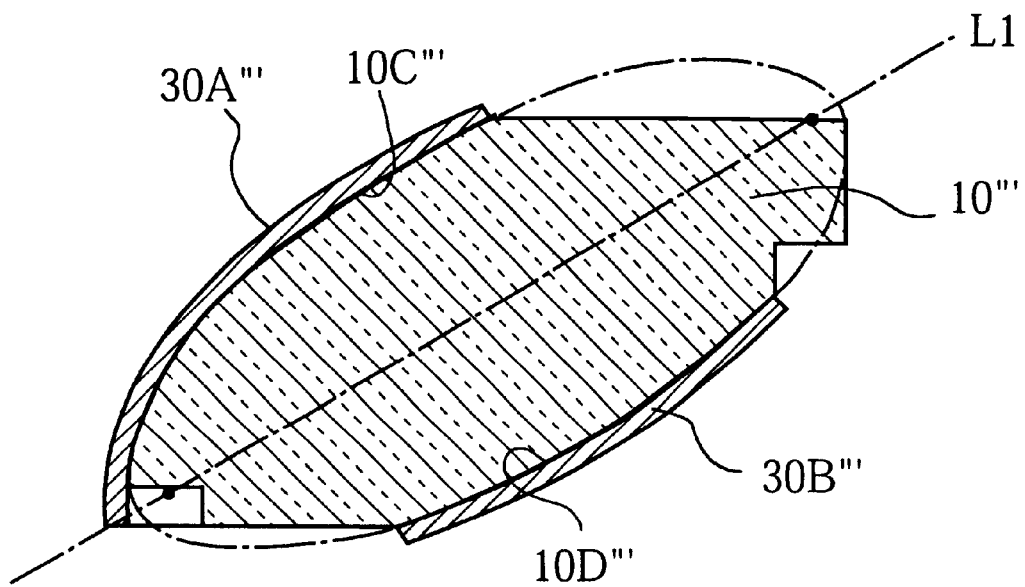
FIGS. 35A–35B show possible examples of arrangements for the light-leading member and reflecting means.

Further, as shown in FIG. 35A, thin, reflective sheets 30A''' and 30B''' may be attached to the first and second side surfaces 10C''' and 10D''', respectively. In this instance, the first and second reflection members 3A'''–3B''' are dispensed with. Instead, the reflective sheets 30A''' and 30B''' may be backed by suitable portions of the housing 4. The reflective sheets 30A''' and 30B''' may be made up of a white paper sheet coated with a transparent resin material. Alternatively, each reflective sheet may include a film made of a resin material such as poly(ethylene terephthalate) or PET, wherein the resin film has a silver, reflection surface.

Figure 35B:
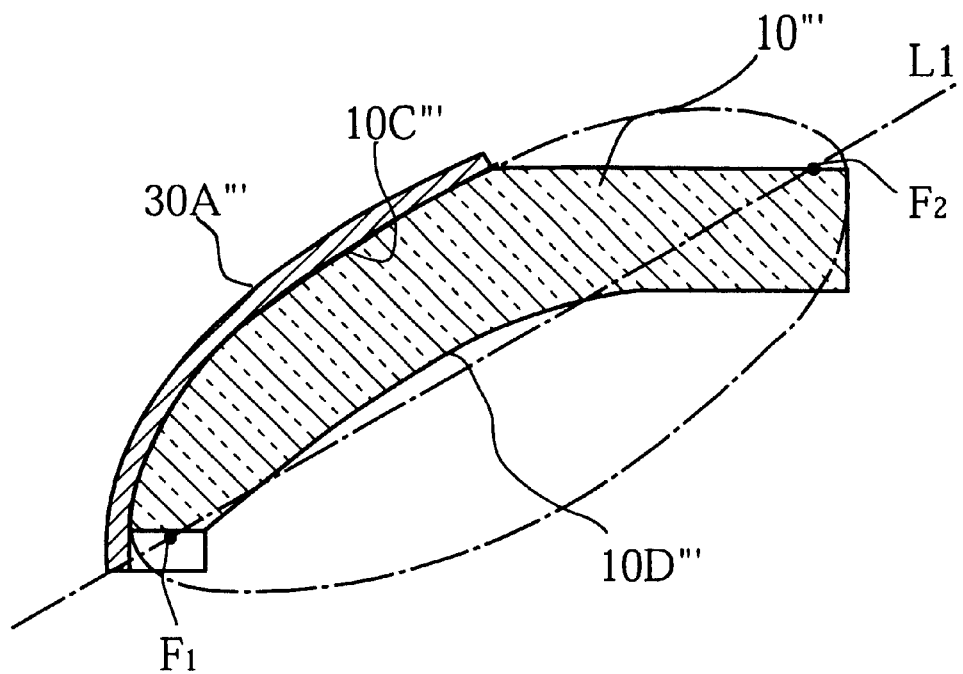

FIG. 35B shows another possible example wherein only a reflective sheet 30A''' is used. In this example, the second side surface 10D''' bulges toward the first side surface 10C''' beyond the single-dot chain line L1 connecting the two foci.

Figure 36A:
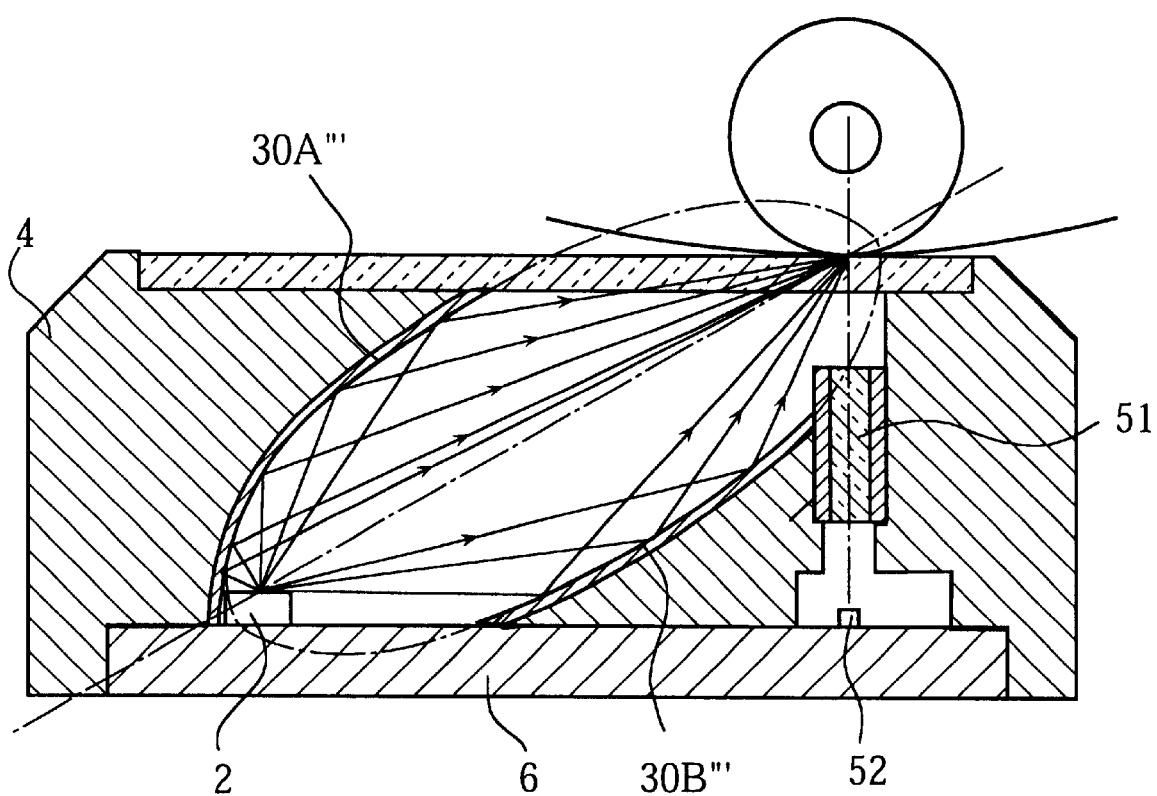
FIGS. 36A–36B show, in section, other modified versions of the image reading apparatus of the fourth embodiment.
Figure 36B:
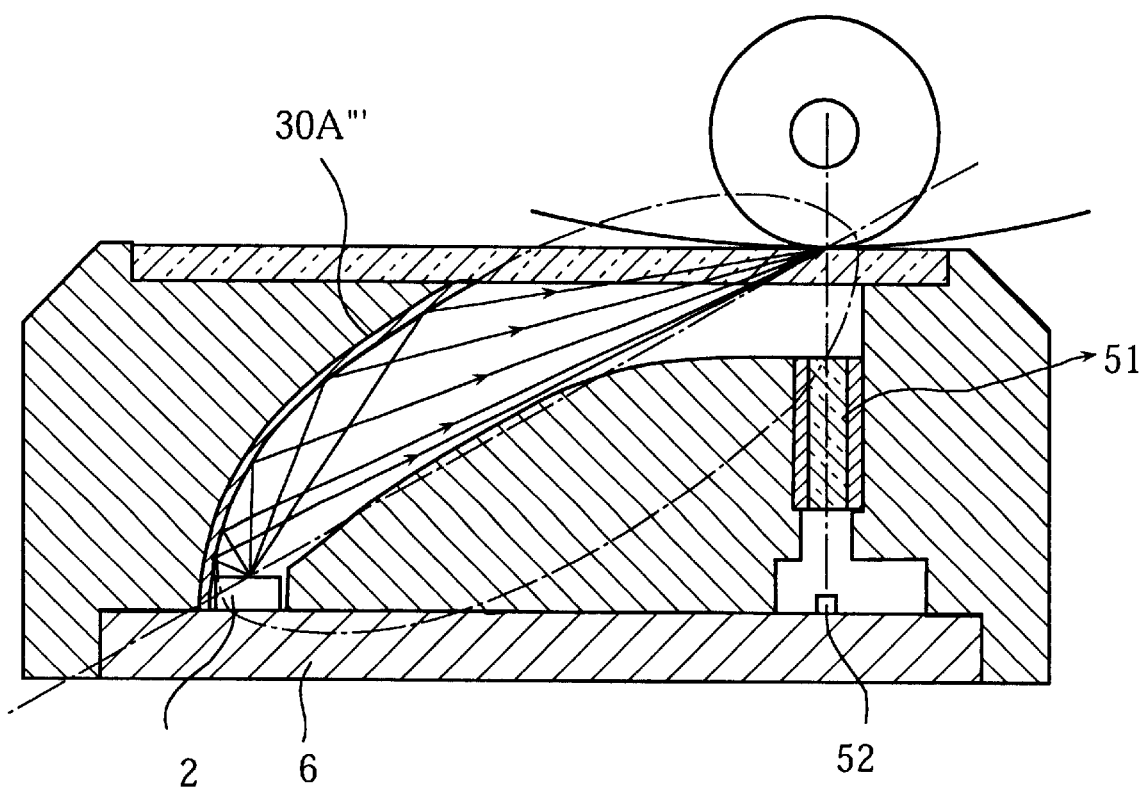

FIGS. 36A and 36B show other possible examples, wherein no transparent light-leading member used. Instead, inner portions of the housing 4 are suitably formed to provide the same effect as the light-leading member 10''' does. In the example shown in FIG. 36A, reflective sheets 30A''' and 30B''' are used, whereas in the example of FIG. 36B, only a reflective sheet 30A''' is used.

The preferred embodiments of the present invention being thus described, it is obvious that the same may be varied in various ways.

Figure 37A:
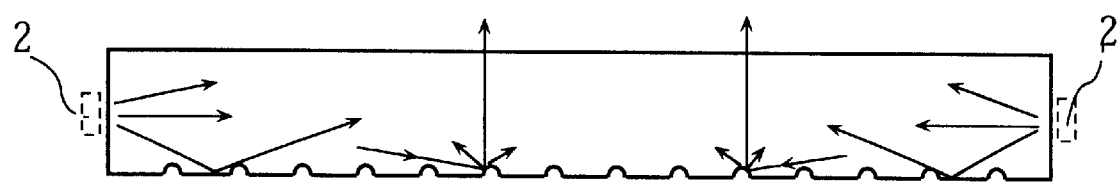
FIGS. 37A–37B show possible arrangements for a light-leading member and lighting means embodying the present invention.
Figure 37B:
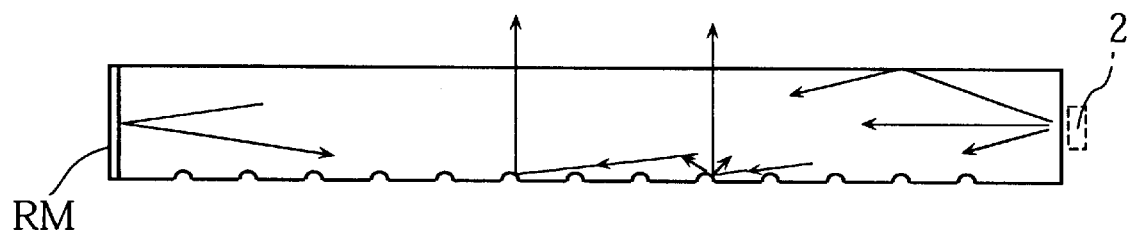
Figure 38:
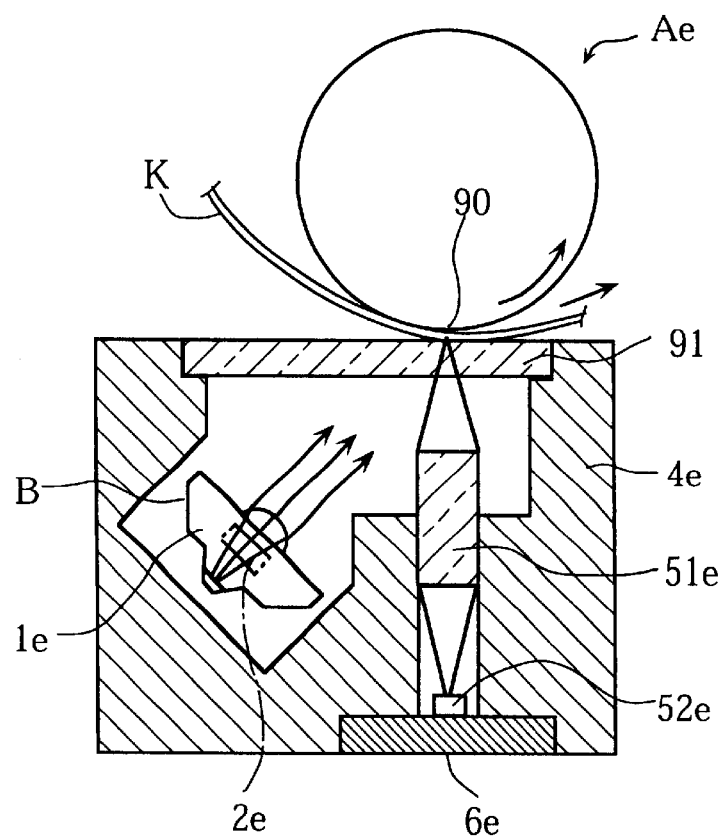
FIG. 38 illustrates, in section, a conventional image reading apparatus.
Figure 39:
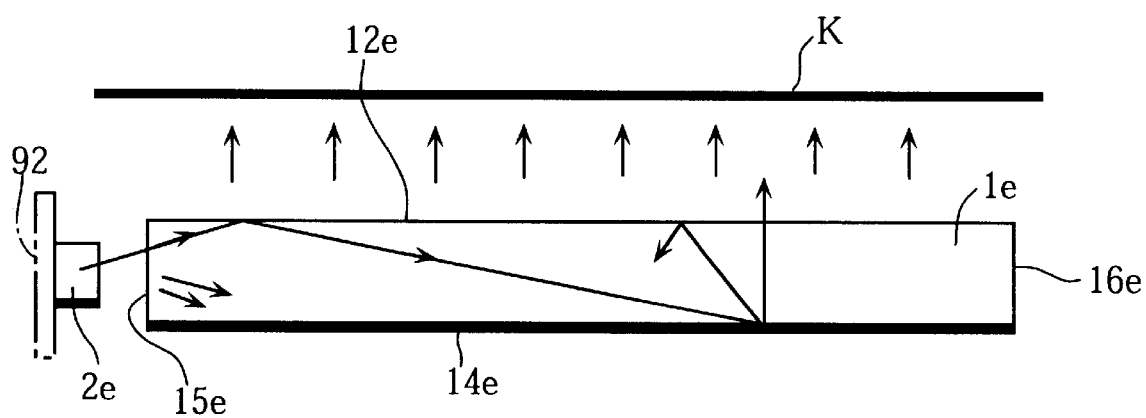
FIG. 39 illustrates the function of the light-leading member used for the conventional image reading apparatus.

For instance, as shown in FIG. 37A, two light sources 2 may be arranged in a facing manner with respect to the vertical end surfaces of a light-leading member. Alternatively, as shown in FIG. 37B, only one light source 2 may be arranged in a facing manner to a vertical end surface of a light-leading member. In this instance, the other end of the light-leading member is covered with a suitable reflective member RM.

Such variations should not be regarded as a departure from the spirit and scope of the invention, and all such variations as would be obvious to those skilled in the art are intended to be included within the scope of the appended claims.

What is claimed is:

1. An image reading apparatus comprising:

a light source for irradiating a document sheet with light;

an elongated light-leading member for propagation of light emitted from the light source, the light-leading member being provided with a head surface, a bottom surface, a first side surface and a second side surface, the first and second side surfaces extending between the head surface and the bottom surface;

a row of image sensor chips for detecting light reflected on the document sheet; and a circuit board for carrying the image sensor chips;

wherein the light source is mounted on the circuit board together with the image sensor chips, the light source being spaced from the row of the image sensor chips on the circuit board, the light source facing the bottom surface of the light-leading member, the head surface of the light-leading member being offset from the bottom surface in a direction from the light source to the row of image sensor chips.

2. A light equipment used in an image reader comprising:

a light source;

an elongated light-leading member for propagation of light emitted from the light source, the light-leading member being provided with a head surface, a bottom surface, a first side surface, a second side surface, a first end and a second end opposite to the first end, the first and second side surfaces extending between the head surface and the bottom surface; and reflecting means for covering at least one of the first and the second side surfaces;

wherein the light source faces the bottom surface at the second end of the light-leading member, the light-leading member being provided with a reflection surface inclined with respect to the bottom surface at the second end of the light-leading member for reflecting light emitted from the light source toward the first end of the light-leading member.

3. The light equipment according to claim 2, wherein the reflecting means comprises an elongated reflection member made of a white, reflective resin material.

4. The light equipment according to claim 2, wherein the reflecting means comprises a reflective sheet.

5. The light equipment according to claim 2, wherein the light-leading member and the reflecting means are positionally secured to each other by engaging means.

6. The light equipment according to claim 2, wherein the light-leading member has an asymmetric cross section.

7. The light equipment according to claim 6, wherein the first side surface comprises an inclined portion overhanging the bottom surface.

8. The light equipment according to claim 6, wherein the asymmetric cross section is pentagonal.

9. The light equipment according to claim 2, wherein said at least one of the first and second side surfaces extends, in cross-section, along a parabola.

10. The light equipment according to claim 2, wherein said at least one of the first and second side surfaces extends, in cross-section, along an ellipse.

11. An image reading apparatus comprising:

a light source for irradiating a document sheet with light;

an elongated light-leading member for propagation of light emitted from the light source, the light-leading member being provided with a head surface, a bottom surface, a first side surface, a second side surface, a first end and a second end opposite to the first end, the first and second side surfaces extending between the head surface and the bottom surface; and reflecting means for covering at least one of the first and the second side surfaces;

a row of image sensor chips for detecting light reflected on the document sheet; and a circuit board for carrying the image sensor chips;

wherein the light source is mounted on the circuit board together with the image sensor chips and faces the bottom surface at the second end of the light-leading member, the light-leading member being provided with a reflection surface inclined with respect to the bottom surface at the second end of the light-leading member for reflecting light emitted from the light source toward the first end of the light leading member.

12. The image reading apparatus according to claim 11, wherein the first side surface comprises an inclined portion overhanging the bottom surface.

13. The image reading apparatus according to claim 11, wherein the head surface is smaller in cross-sectional dimension than the bottom surface.

14. The image reading apparatus according to claim 11, wherein at least one of the first and second side surfaces extends, in cross-section, along a parabola.

15. The image reading apparatus according to claim 14, wherein the bottom surface is arranged adjacent to a focus of the parabola.

16. The image reading apparatus according to claim 11, wherein at least one of the first and second side surfaces extends, in cross-section, along an ellipse.

17. The image reading apparatus according to claim 16, wherein the bottom surface is arranged adjacent to a focus of the ellipse.

* * * * *